United States Patent
Ando et al.

(10) Patent No.: US 8,007,936 B2
(45) Date of Patent: Aug. 30, 2011

(54) ELECTRIC STORAGE DEVICE

(75) Inventors: Nobuo Ando, Tokyo (JP); Kenji Kojima, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 466 days.

(21) Appl. No.: 12/267,782

(22) Filed: Nov. 10, 2008

(65) Prior Publication Data

US 2009/0123823 A1 May 14, 2009

(30) Foreign Application Priority Data

Nov. 12, 2007 (JP) .................. 2007-293361

(51) Int. Cl.
*H01M 10/40* (2006.01)
*H01M 4/48* (2010.01)
*H01M 4/72* (2006.01)
*H01M 4/80* (2006.01)

(52) U.S. Cl. .................. 429/152; 429/231.3; 429/231.8; 429/241

(58) Field of Classification Search .................. 429/152, 429/241
See application file for complete search history.

(56) References Cited

U.S. PATENT DOCUMENTS

| 2003/0134188 A1* | 7/2003 | Roy et al. .................. 429/128 |
| 2005/0153173 A1* | 7/2005 | Kumashiro et al. .................. 429/9 |

FOREIGN PATENT DOCUMENTS

| JP | 2000-036325 A | 2/2000 |
| JP | 2001-351688 A | 12/2001 |
| JP | 2005-203131 A | 7/2005 |
| WO | WO-02/41420 A1 | 5/2002 |

* cited by examiner

*Primary Examiner* — John S Maples
(74) *Attorney, Agent, or Firm* — McDermott Will & Emery LLP

(57) ABSTRACT

An electric storage device 10 has a first electric storage component 29 and a second electric storage component 30. The first component 29 and the second component 30 are connected in parallel. A positive-electrode mixture layer 22 contains a lithium cobaltate to increase a capacity. A positive-electrode mixture layer 27 contains an activated carbon to increase an output. A current collector 16 having through holes 16a is provided between the layers 22 and 27. A positive electrode terminal 25 is connected to a positive-electrode current collector 21 of the first component 29 through an electricity supply path 24 provided with a resistor 23. By this configuration, the electric current flowing through the first electric storage component 29 can be restricted when the device is charged or discharged with high current.

14 Claims, 13 Drawing Sheets

(A) Before discharge (B) During low-rate discharge (A) Before discharge (B) During high-rate discharge (C) After discharge

ELECTRIC STORAGE DEVICE

CROSS REFERENCE TO RELATED APPLICATION

This application claims the benefit under 35 U.S.C. §119 of Japanese Patent Application No. 2007-293361, filed on Nov. 12, 2007, which is hereby incorporated by reference herein in its entirety.

BACKGROUND OF THE INVENTION

1. Field of the Invention

The present invention relates to a technology that is well adaptable to an electric storage device including plural positive electrodes, each having a different capacity.

2. Description of the Related Arts

An increased capacity or increased output is demanded for an electric storage device that is mounted in an electric vehicle, hybrid vehicle, or the like. Therefore, a lithium ion secondary battery, an electric double layer capacitor, and the like have been nominated as candidates for the electric storage device. However, the lithium ion secondary battery has a high capacity, but low output. The electric double layer capacitor has a high output, but low capacity.

In view of this, there has been proposed an electric storage device called a hybrid capacitor in which the electric storage mechanisms of the lithium ion secondary battery and the electric double layer capacitor are combined. The hybrid capacitor employs an activated carbon, which is used for the electric double layer capacitor, as a positive-electrode material. By this structure, charges are accumulated in the positive electrode of the hybrid capacitor by utilizing the electric double layer. On the other hand, the hybrid capacitor employs a carbon material, which is used for a lithium ion secondary battery, as a negative-electrode material. By this structure, lithium ions are doped into the carbon material of the negative electrode in the hybrid capacitor so as to accumulate charges. The application of the electric storage mechanism described above makes it possible to increase the capacity and output of the hybrid capacitor. However, a further improvement in the capacity and the output has been demanded in order to use the electric storage described above for a vehicle power source.

Methods for enhancing both of a capacity and output of an electric storage device include the one in which an internal resistance is decreased by coating an electrode mixture material to be thin, and the one in which a battery having a high capacity characteristic and a capacitor having a high output characteristic are connected in parallel. However, in the method in which the electrode mixture material is coated to be thin, the energy density of the electric storage device might be decreased. This method further entails a difficulty in assembling the device, which increases cost. In the method in which the battery and the capacitor are combined, cost might be increased due to a complicated control circuit.

In order to solve these problems, there has been proposed an electric storage device in which positive-electrode current collectors of a lithium ion secondary battery and an electric double layer capacitor are connected to each other, and negative-electrode current collectors of the lithium ion secondary battery and the electric double layer capacitor are connected to each other (e.g., see JP-A-2001-351688). Further, an electric storage device has been proposed in which a slurry including an activated carbon or the like and a slurry including a lithium cobaltate or the like are coated double on a current collector (e.g., see JP-A-2000-36325 and JP-A-2005-203131), or an electric storage device has been proposed in which a slurry having mixed therein an activated carbon and a lithium cobaltate is coated on a current collector (e.g., see International Publication WO2002/41420).

However, in the electric storage device disclosed in JP-A-2001-351688, it is difficult to cancel the deviation in the potential between the electrodes that are connected to each other. Therefore, overdischarge or overcharge might locally be produced in the positive electrode or the negative electrode. The overdischarge or overcharge described above causes the deterioration in durability of the electric storage device. The electric storage devices disclosed in JP-A-2000-36325, JP-A-2005-203131, and International Publication WO2002/41420 have a structure in which the activated carbon and the lithium cobaltate are mixed or a structure in which the activated carbon and the lithium cobaltate are coated in a double layer manner. In the electrode structures described above, it is difficult to sufficiently decrease the internal resistance. Further, the electric storage devices have a structure in which the lithium cobaltate is in contact with the activated carbon. Therefore, the affect caused by the deteriorated lithium cobaltate might affect the activated carbon, which deteriorates the durability of the electric storage device. Further, the electric storage devices disclosed in JP-A-2001-351688, JP-A-2000-36325, JP-A-2005-203131, and International Publication WO2002/41420 have a structure in which a large load is applied to the lithium cobaltate when the electric storage devices are charged or discharged with a high current. The electrode structure described above also causes the deterioration in durability of the electric storage device.

SUMMARY OF THE INVENTION

An object of the present invention is to enhance durability of an electric storage device having a high capacity characteristic and a high output characteristic.

An electric storage device according to the present invention has a first electric storage component including a first positive-electrode mixture layer and a negative-electrode mixture layer opposite to the first positive-electrode mixture layer, and a second electric storage component that is connected in parallel to the first electric storage component and includes a second positive-electrode mixture layer and a negative-electrode mixture layer opposite to the second positive-electrode mixture layer, wherein the positive-electrode mixture layer contains a positive-electrode active material that allows ions to be reversibly doped thereinto and dedoped therefrom, the negative-electrode mixture layer contains a negative-electrode active material that allows ions to be reversibly doped thereinto and dedoped therefrom, the capacity of the first positive-electrode mixture layer is set higher than the capacity of the second positive-electrode mixture layer, the path resistance of the first electric storage component is set higher than the path resistance of the second electric storage component, and a current collector provided between the first positive-electrode mixture layer and the second positive-electrode mixture layer has a through-hole formed therein.

The electric storage device according to the present invention is characterized in that a resistor is provided in an electricity supply path of the first electric storage component so as to set the path resistance of the first electric storage component to be higher than the path resistance of the second electric storage component.

The electric storage device according to the present invention is characterized in that a separator arranged between the first positive-electrode mixture layer and the negative-electrode mixture layer is formed to be thicker than a separator arranged between the second positive-electrode mixture layer and the negative-electrode mixture layer, whereby the path resistance of the first electric storage component is set higher than the path resistance of the second electric storage component.

The electric storage device according to the present invention is characterized in that the number of separators arranged between the first positive-electrode mixture layer and the negative-electrode mixture layer is set to be larger than the number of separators arranged between the second positive-electrode mixture layer and the negative-electrode mixture layer, whereby the path resistance of the first electric storage component is set higher than the path resistance of the second electric storage component.

The electric storage device according to the present invention is characterized in that the electricity supply path of the second electric storage component is set to be smaller? than the electricity supply path of the first electric storage device so as to set the path resistance of the first electric storage component to be higher than the path resistance of the second electric storage component.

The electric storage device according to the present invention is characterized in that a gap is formed between the first positive-electrode mixture layer and the negative-electrode mixture layer in the first electric storage component so as to set the path resistance of the first electric storage component to be higher than the path resistance of the second electric storage component.

The electric storage device according to the present invention is characterized in that, when the device includes plural first positive-electrode mixture layers and at least one or more second positive-electrode mixture layer, the outermost positive-electrode mixture layer is defined as the first positive-electrode mixture layer.

The electric storage device according to the present invention is characterized by including a lithium ion source provided to be opposite to one of the negative electrodes having the first negative-electrode mixture layer, wherein lithium is doped into the negative-electrode mixture layer from the lithium ion source.

The electric storage device according to the present invention has a device structure of a laminate type or a wound type.

The electric storage device according to the present invention is characterized in that different types of positive-electrode active materials are used for the first positive-electrode mixture layer and the second positive-electrode mixture layer, wherein the capacity of the first positive-electrode mixture layer is set higher than the capacity of the second positive-electrode mixture layer.

The electric storage device according to the present invention is characterized in that, when the same type of positive-electrode active materials are used for the first positive-electrode mixture layer and the second positive-electrode mixture layer, the first positive-electrode mixture layer is coated to be thicker than the second positive-electrode mixture layer so as to set the capacity of the first positive-electrode mixture layer to be higher than the capacity of the second positive-electrode mixture layer.

The electric storage device according to the present invention is characterized in that the positive-electrode active material contained in the first positive-electrode mixture layer and the second positive-electrode mixture layer is selected from an activated carbon, conductive polymer, polyacene-based material, lithium-containing metal oxide, transition metal oxide, transition metal sulfide, iron phosphate, ruthenium oxide, inorganic sulfur, organic molecule containing sulfur atom involved in a redox, and a high-molecule material that has, as a monomer, an organic molecule containing sulfur atom involved in a redox.

The electric storage device according to the present invention is characterized in that the positive-electrode active material contained in the first positive-electrode mixture layer is $LiCoO_2$, and the positive-electrode active material contained in the second positive-electrode mixture layer is an activated carbon.

The electric storage device according to the present invention is characterized in that the negative-electrode active material contained in the negative-electrode mixture layer is a polyacene-based organic semiconductor, wherein the ratio of (the number of hydrogen atoms)/(the number of carbon atoms) is 0.05 or more and 0.50 or less.

In the present invention, the first electric storage component including the first positive-electrode mixture layer and the second electric storage component including the second positive-electrode mixture layer are connected in parallel to each other. The capacity of the first positive-electrode mixture layer is set higher than the capacity of the second positive-electrode mixture layer, and the current collector arranged between the first positive-electrode mixture layer and the second positive-electrode mixture layer has a through-hole formed therein. By this structure, the high capacity characteristic of the first positive-electrode mixture layer is sufficiently utilized during a low-rate discharge, while the increased output and the increased capacity of the electric storage device can be achieved even during the high-rate discharge.

Further, the path resistance of the first electric storage component is set higher than the path resistance of the second electric storage component. By this structure, the load applied to the first positive-electrode mixture layer when the charging/discharging operation with a high current is performed can be reduced. Moreover, the load applied to the negative-electrode mixture layer, which is opposite to the first positive-electrode mixture layer, can also be reduced. Accordingly, the durability of the electric storage device can be enhanced.

DETAILED DESCRIPTION OF THE PREFERRED EMBODIMENTS

Figure 1:
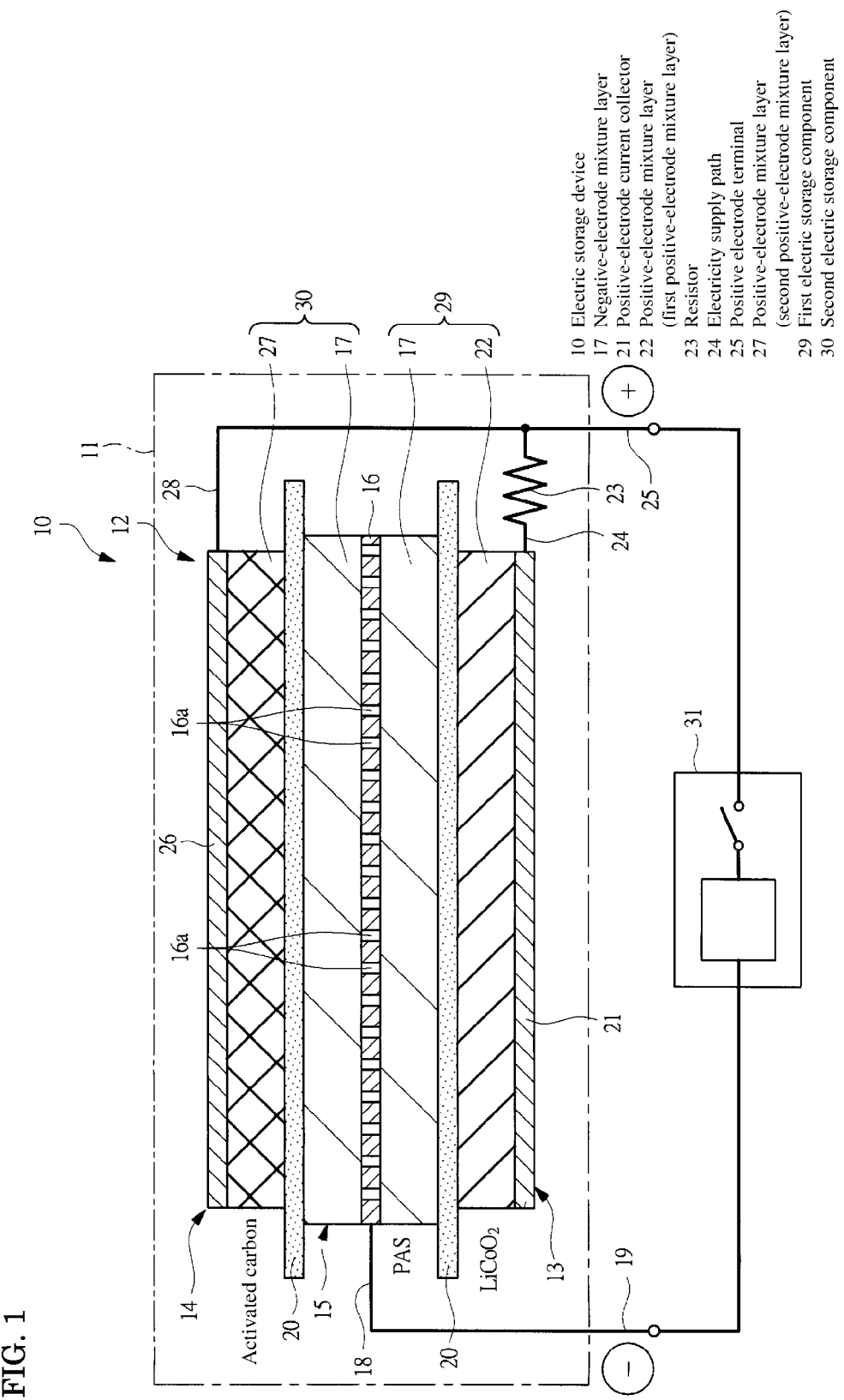
FIG. 1 is a sectional view schematically showing an internal structure of an electric storage device according to one embodiment of the present invention.

FIG. 1 is a sectional view schematically showing an internal structure of an electric storage device 10 according to one embodiment of the present invention. As shown in FIG. 1, a laminate film 11 of the electric storage device 10 forms an outer casing. An electrode laminate unit 12 is arranged at the inside of the laminate film 11. The electrode laminate unit 12 is composed of two positive electrodes 13 and 14, and a negative electrode 15. An electrolyte solution is injected into the laminate film 11 that is sealed by a thermal welding or the like. The electrolyte solution is made of aprotic organic solvent containing lithium salt.

The negative electrode 15 is arranged at the center of the electrode laminate unit 12. The negative electrode 15 has a negative-electrode current collector (current collector) 16 provided with a large number of through-holes 16a. The negative electrode 15 has negative-electrode mixture layers 17 coated on both surfaces of the negative-electrode current collector 16. A negative electrode terminal 19 is connected to the negative-electrode current collector 16 through an electricity supply path 18. The positive electrode 13 is arranged so as to be opposite to one surface of the negative electrode 15. A separator 20 is provided between the positive electrode 13 and the negative electrode 15. The positive electrode 13 includes a positive-electrode current collector (current collector) 21 and a first positive-electrode mixture layer 22 coated on the positive-electrode current collector 21. A positive electrode terminal 25 is connected to the positive-electrode current collector 21 through an electricity supply path 24. A resistor 23 is mounted in the electricity supply path 24. The positive electrode 14 is arranged so as to be opposite to the other surface of the negative electrode 15. A separator 20 is provided between the positive electrode 14 and the negative electrode 15. The positive electrode 14 includes a positive-electrode current collector (current collector) 26 and a second positive-electrode mixture layer 27 coated on the positive-electrode current collector 26. The positive electrode terminal 25 is connected to the positive-electrode current collector 26 through an electricity supply path 28.

As described above, the electric storage device 10 includes a first electric storage component 29 composed of the positive-electrode mixture layer 22 and the negative-electrode mixture layer 17 opposite to the positive-electrode mixture layer 22. The electric storage device 10 also includes a second electric storage component 30 composed of the positive-electrode mixture layer 27 and the negative-electrode mixture layer 17 opposite to the positive-electrode mixture layer 27. The first electric storage component 29 and the second electric storage component 30 are connected in parallel to each other. A charge/discharge tester 31 is connected to the positive electrode terminal 25 and the negative electrode terminal 19. The charge/discharge tester 31 controls a charged state or a discharged state of the electric storage device 10.

The positive-electrode mixture layer 22 of the positive electrode 13 contains a lithium cobaltate ($LiCoO_2$), which is a transition metal oxide, as a positive-electrode active material. The lithium cobaltate allows lithium ions to be reversibly doped thereinto and dedoped therefrom (hereinafter referred to as dope and dedope). By using the lithium cobaltate, the capacity of the positive-electrode mixture layer 22 is increased and a high energy density is achieved. The positive-electrode mixture layer 27 of the positive electrode 14 contains an activated carbon as a positive-electrode active material. The activated carbon allows lithium ions or anions to be reversibly doped thereinto and dedoped therefrom. By using the activated carbon, the output of the positive-electrode mixture layer 27 is increased and a high output density is achieved. The negative-electrode mixture layer 17 of the negative electrode 15 contains a polyacene-based organic semiconductor (PAS) as a negative-electrode active material. The PAS allows lithium ions to be reversibly doped thereinto and dedoped therefrom. Lithium ions are doped beforehand into the negative electrode 15 from a lithium ion source such as a metal lithium or the like, by which a potential of the negative electrode is lowered and the cell voltage is increased, whereby the capacity of the electric storage device 10 is increased. The negative electrode 15 has an electrode area larger than that of the positive electrodes 13 and 14, by which the deposition of the metal lithium on the negative electrode 15 is prevented.

In the specification of the present invention, the term "doping (dope)" involves "occlude", "carry", "absorb" or "insert", and specifically a phenomenon where lithium ions and/or anions enter the positive-electrode active material or the negative-electrode active material. The term "dedoping (dedope)" involves "release" and "desorb", and specifically a phenomenon where lithium ions or anions desorb from the positive-electrode active material or the negative-electrode active material.

Figure 2:
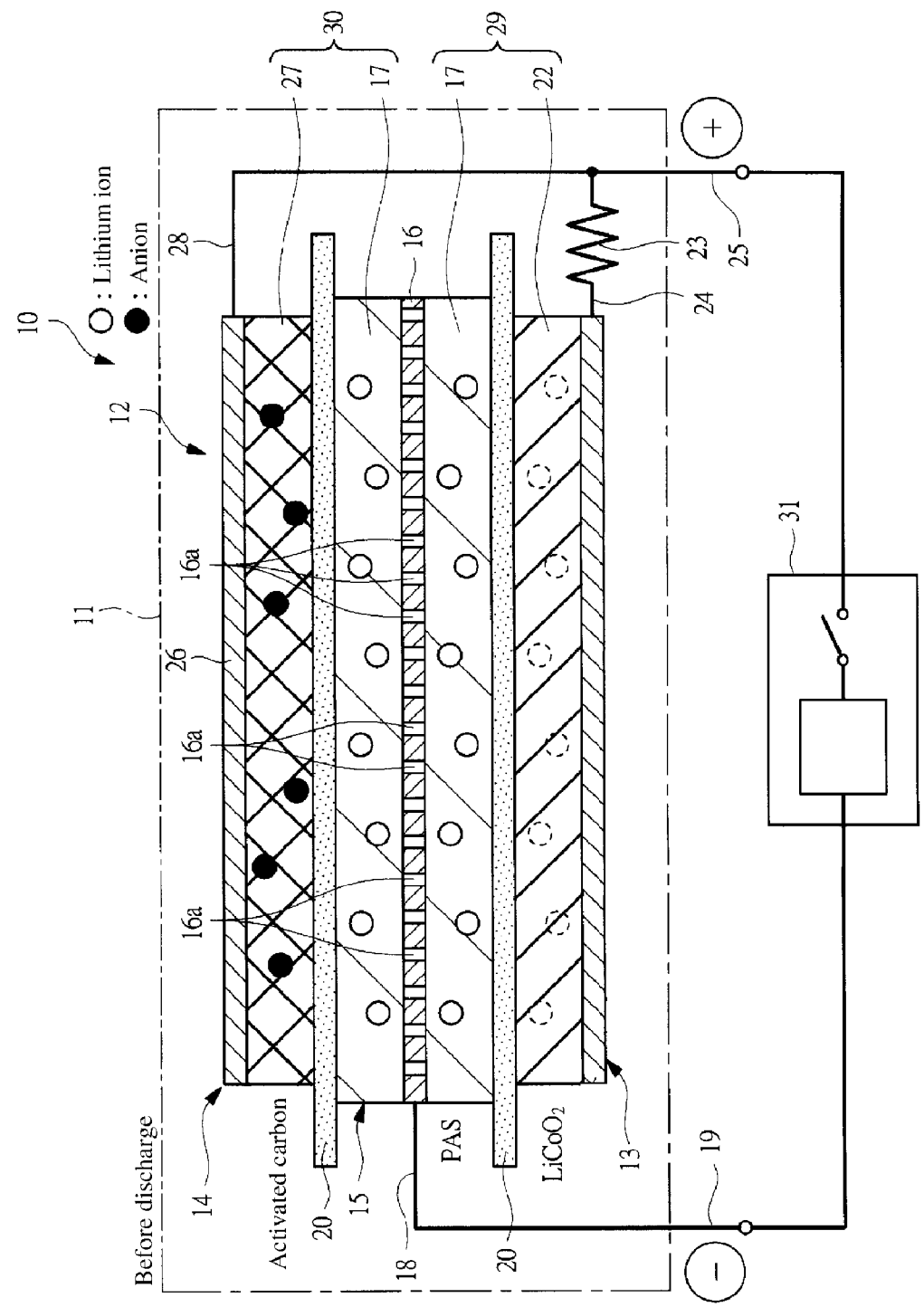
FIG. 2 is an explanatory view showing a charge/discharge operation of the electric storage device according to one embodiment of the present invention.
Figure 3:
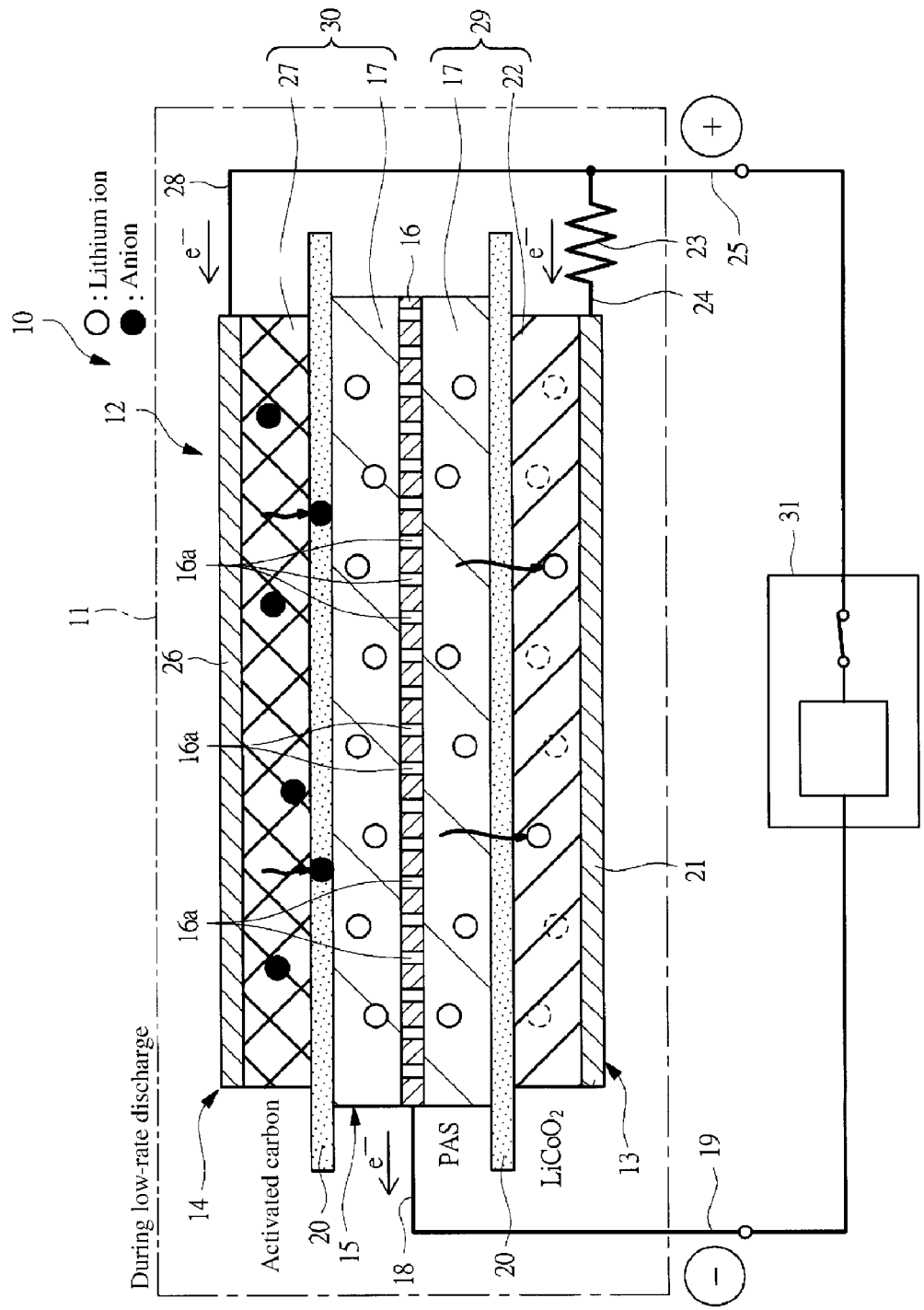
FIG. 3 is an explanatory view showing a charge/discharge operation of the electric storage device according to one embodiment of the present invention.
Figure 4:
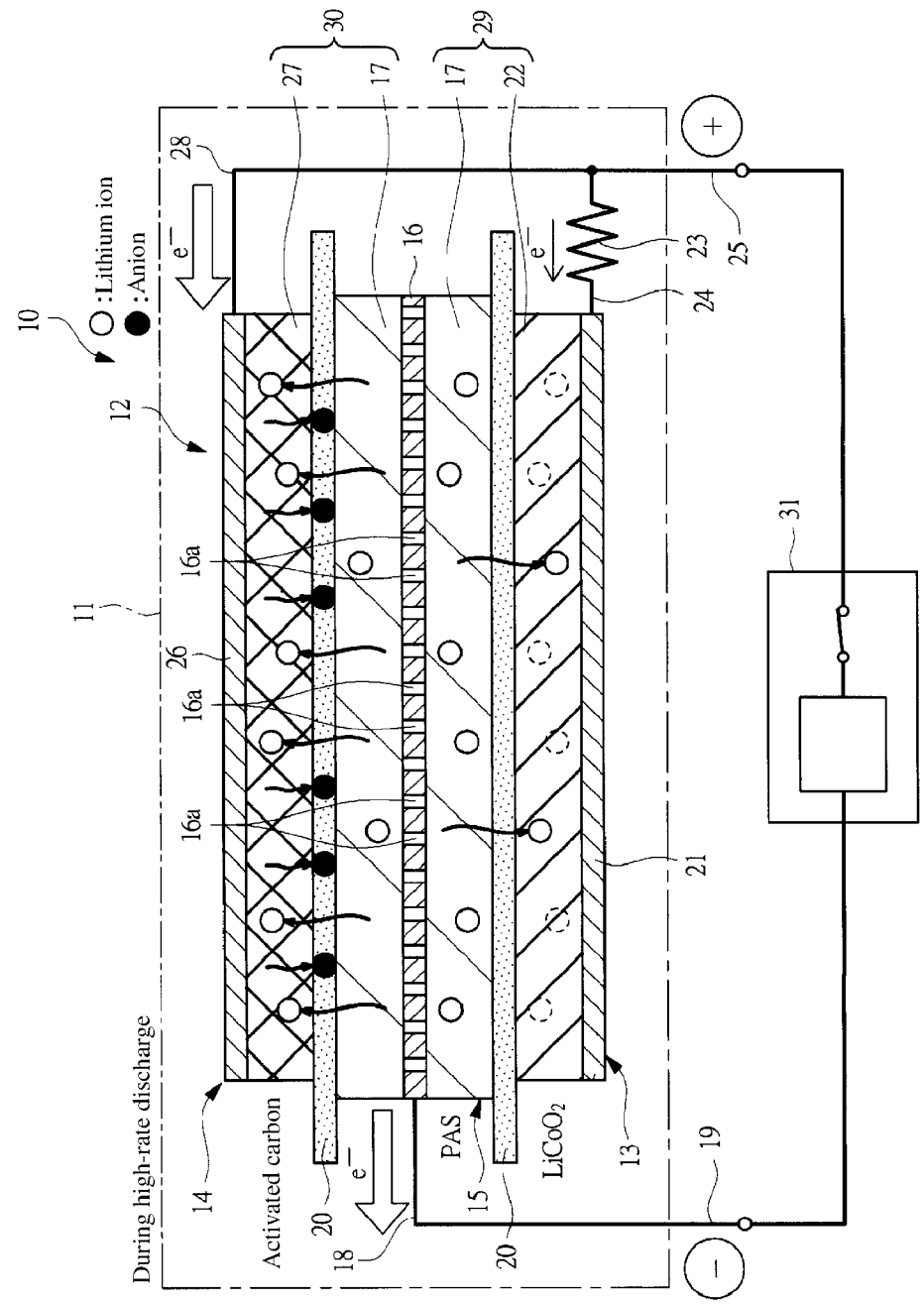
FIG. 4 is an explanatory view showing a charge/discharge operation of the electric storage device according to one embodiment of the present invention.
Figure 5:
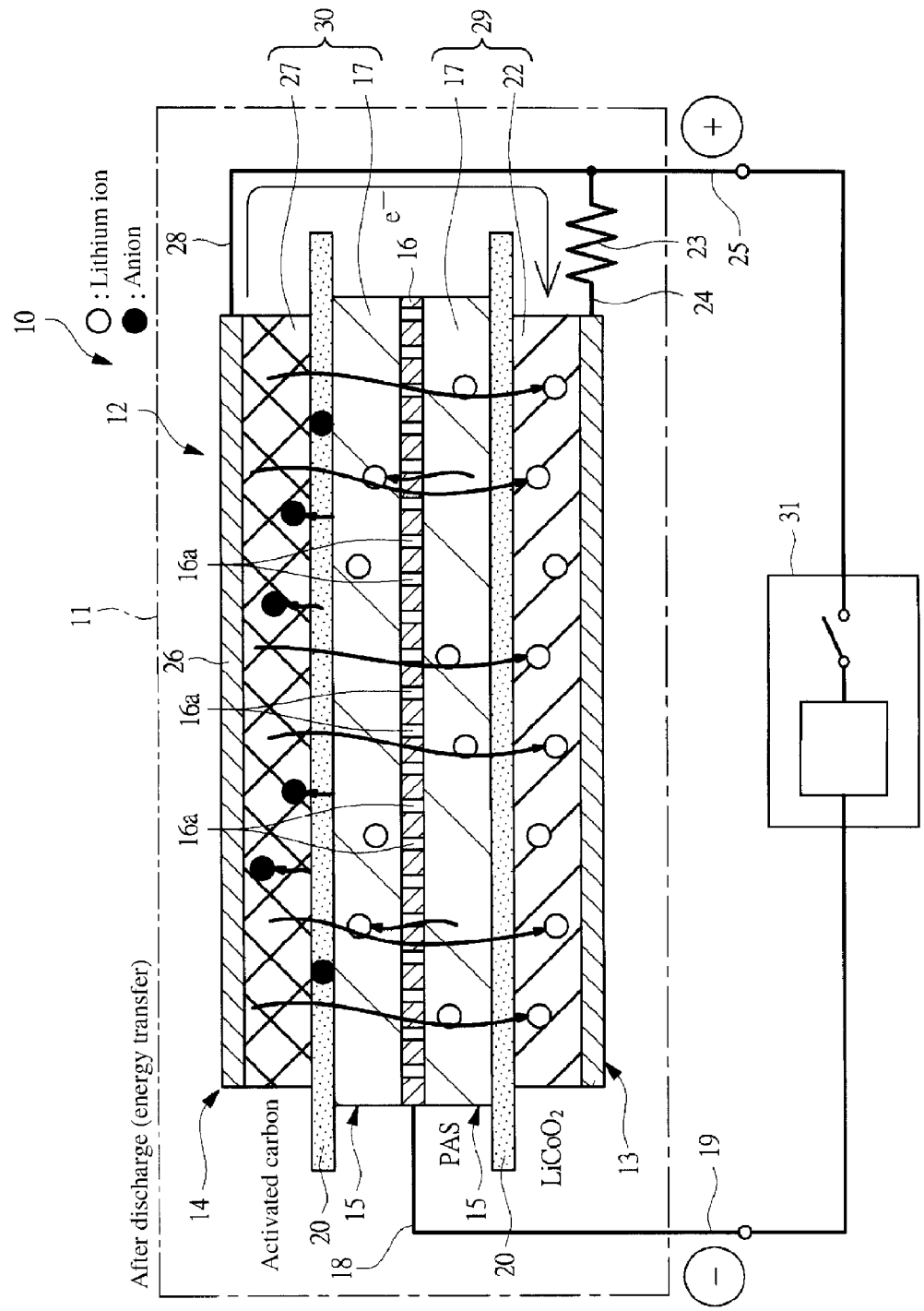
FIG. 5 is an explanatory view showing a charge/discharge operation of the electric storage device according to one embodiment of the present invention.

Subsequently explained is a discharge operation of the electric storage device 10 having the aforesaid structure. FIGS. 2 to 5 are explanatory views showing charge/discharge operation of the electric storage device 10, wherein FIG. 2 shows the state during the charging, FIG. 3 shows the state during the discharge with low-rate (when the electric storage device 10 is discharged with a small current), FIG. 4 shows the state during the discharge with high-rate (when the electric storage device 10 is discharged with a high current), and FIG. 5 shows the state after the high-rate discharge. FIGS. 2 to 5 are schematic views, wherein the number and balance of the anions or lithium ions are not considered.

As shown in FIG. 2, the electric storage device 10 is charged by operating the charge/discharge tester 31. According to this charging operation, lithium ions are dedoped from the lithium cobaltate of the positive-electrode mixture layer 22. Further, anions are doped into the activated carbon of the positive-electrode mixture layer 27. Accordingly, the potentials of the positive electrodes of the positive-electrode mixture layers 22 and 27 are increased. Further, lithium ions are doped into the PAS of the negative-electrode mixture layer 17. Accordingly, the potential of the negative electrode of the negative-electrode mixture layer 17 is lowered.

Next, as shown in FIG. 3, the electric storage device 10 is discharged with low rate by operating the charge/discharge tester 31. According to this low-rate discharge, the lithium ions are gradually doped into the lithium cobaltate in the positive-electrode mixture layer 22. The anions are gradually dedoped from the activated carbon in the positive-electrode mixture layer 27. The lithium ions are gradually dedoped from the PSA in the negative-electrode mixture layer 17. Specifically, during the low-rate discharge, electrons slowly move from the negative-electrode current collector toward the positive-electrode current collectors 21 and 26. Therefore, energy is emitted from the electric storage components 29 and 30 with a small current. It is to be noted that the lithium ions can gradually be doped into the activated carbon in the positive-electrode mixture layer 27 after the anions are dedoped from the activated carbon in the positive-electrode mixture layer 27, depending upon the voltage at the time of completing the discharge.

As described above, the lithium ions or anions slowly move between the positive-electrode mixture layers 22 and 27 and the negative-electrode mixture layer 17 during the low-rate discharge. Accordingly, the high capacity characteristic of the lithium cobaltate can sufficiently be utilized, whereby a lot of energy can be taken out from the electric storage device 10. Since the lithium ions are gradually doped into the lithium cobaltate, a large load is not applied to the lithium cobaltate having a resistance higher than the resistance of the activated carbon. This prevents the electric storage device 10 from being deteriorated.

On the other hand, as shown in FIG. 4, the charged electric storage device 10 is discharged with high rate by operating the charge/discharge tester 31. According to the high-rate discharge, the anions are rapidly dedoped from the activated carbon in the positive-electrode mixture layer 27, and the lithium ions are rapidly dedoped from the PAS in the negative-electrode mixture layer 17. Further, the lithium ions are doped not only into the positive-electrode mixture layer 22 but also into the positive-electrode mixture layer 27. Specifically, during the high-rate discharge, electrons rapidly move from the negative-electrode current collector 16 toward the positive-electrode current collector 26. Therefore, energy is emitted from the electric storage component 30 with a high current by utilizing the high output characteristic (low resistance) of the activated carbon. The resistor 23 is provided in the electricity supply path 24 of the positive-electrode current collector 21. In general, electrons also rapidly move toward the positive-electrode current collector 21, whereby the lithium ions, which are dedoped from the PAS in the negative-electrode mixture layer 17, are rapidly doped into the lithium cobaltate in the positive-electrode mixture layer 22 during the high-rate discharge. However, since the resistor 23 is provided, the movement of the electrons toward the positive-electrode current collector 21 is restricted, with the result that the rapid dope of the lithium ions into the positive-electrode mixture layer 22 is suppressed. Therefore, a large load is not applied to the positive-electrode mixture layer 22 containing the lithium cobaltate. Accordingly, the deterioration of the positive-electrode mixture layer 22 can be prevented, and the durability of the electric storage device 10 can be enhanced. As described above, the lithium ions can rapidly be doped into the activated carbon in the positive-electrode mixture layer 27 after the anions are dedoped from the activated carbon in the positive-electrode mixture layer 27, depending upon the voltage at the time of completing the discharge.

As shown in FIG. 4, when the high-rate discharge is executed, the potential of the positive-electrode mixture layer 22 becomes temporarily less than the potential of the positive-electrode mixture layer 27. However, as shown in FIG. 5, the negative-electrode current collector 16 having through-holes 16a formed therein is provided between the positive-electrode mixture layer 22 and the positive-electrode mixture layer 27. Therefore, the lithium ions gradually move from the positive-electrode mixture layer 27 to the positive-electrode mixture layer 22, and the anions move to the positive-electrode mixture layer 22 through the through-holes 16a. The movement of the lithium ions and the anions continues until the potential of the positive-electrode mixture layer 22 and the potential of the positive-electrode mixture layer 27 are balanced. Thus, even if the potential difference is caused between the positive-electrode mixture layer 22 and the positive-electrode mixture layer 27, the potential difference can be canceled through the movement of the lithium ions between the positive-electrode mixture layers 22 and 27. The load involved with the potential difference can be eliminated, whereby the deterioration of the positive-electrode mixture layers 22 and 27 can be prevented. The lithium ions are moved between the positive-electrode mixture layers 22 and 27, whereby energy can be transferred between the positive-electrode mixture layers 22 and 27. Consequently, even when the energy of the electric storage component 30 is exhausted first due to the high-rate discharge, energy can be transferred from the positive-electrode mixture layer 22 to the positive-electrode mixture layer 27. Specifically, even if the energy of the electric storage component 30 is exhausted, energy can be emitted again from the electric storage component 30 with a high current.

Figure 6:
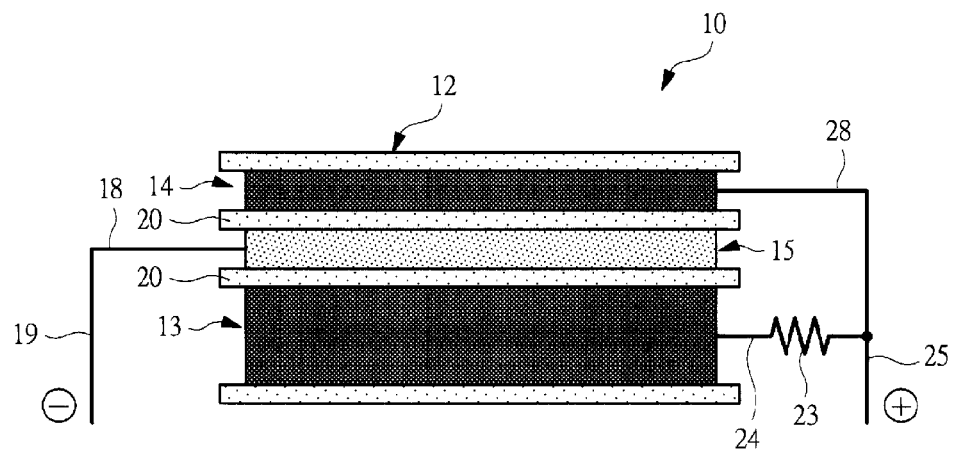
FIGS. 6A and 6B are image views showing an energy transfer condition when a low-rate discharge is executed.
Figure 6:
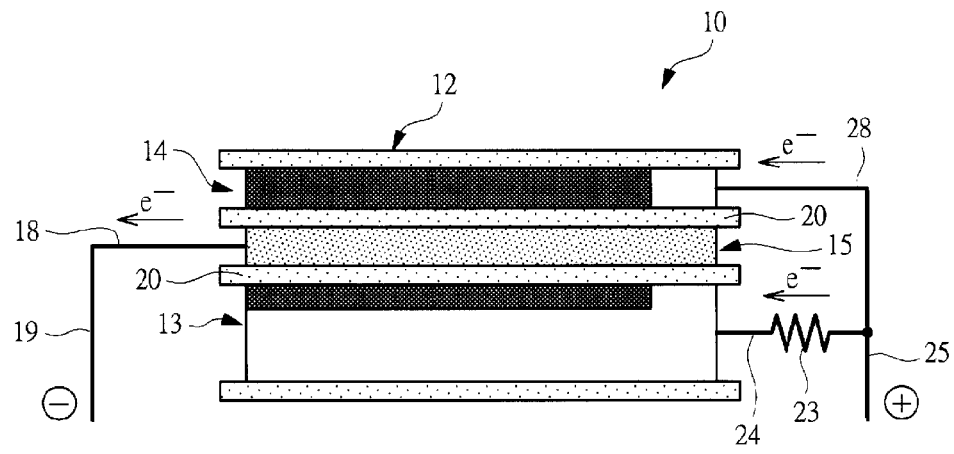
Figure 7:
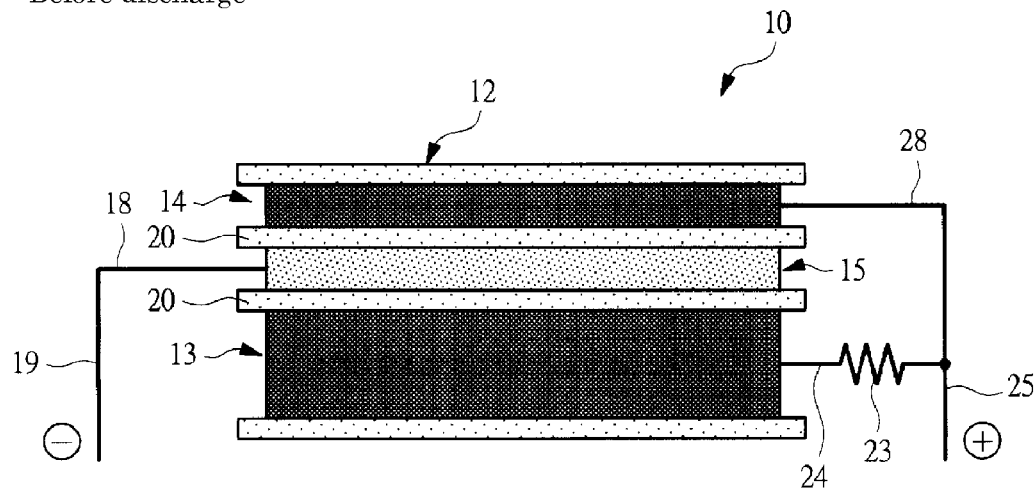
FIGS. 7A to 7C are image views showing an energy transfer condition when a high-rate discharge is executed.
Figure 7:
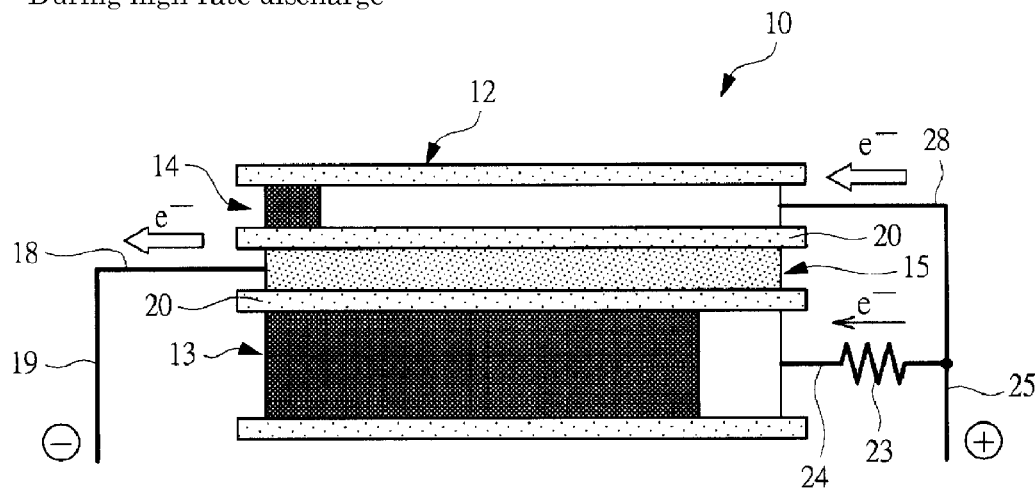
Figure 7:
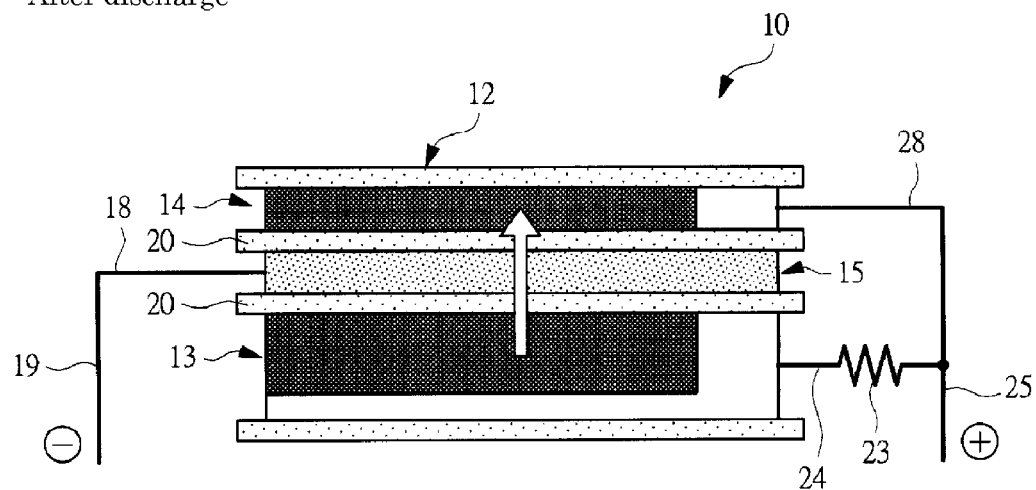

FIGS. 6A and 6B are schematic views showing the energy transfer condition when the low-rate discharge is executed. FIGS. 7A to 7C are schematic views showing the energy transfer condition when the high-rate discharge is executed. In FIGS. 6A and 6B and 7A to 7C, the change in the potential of the positive electrodes 13 and 14 is indicated by the lateral length of a half-tone dot meshing. Further, In FIGS. 6A and 6B and 7A to 7C, the remaining energy amount of the positive electrodes 13 and 14 is indicated by the area of the half-tone dot meshing. Specifically, in FIGS. 6A and 6B and 7A to 7C, the area of the white part of the positive electrodes 13 and 14 indicates the emitted energy amount. As shown in FIGS. 6A and 6B, energy is emitted from the positive electrode 13 containing the lithium cobaltate and the positive electrode 14 containing the activated carbon during the low-rate discharge. Since the positive electrode 13 containing the lithium cobaltate is provided as described above, a lot of energy can be taken out from the positive electrode 13 by utilizing the high capacity characteristic of the lithium cobaltate. Accordingly, the capacity of the electric storage device 10 during the low-rate discharge can be increased.

The amount of the active material is set such that the potential of the positive electrode at 0 V of the cell voltage becomes not less than a predetermined potential even if the low-rate discharge is performed until the cell voltage becomes 0 V. By setting the potential of the positive electrode to be not less than the predetermined potential (e.g., 1.5 V (vs. Li/Li$^+$)), the deterioration of the structure of the lithium cobaltate can be avoided. The potential of the positive electrode is set to be not less than the predetermined potential (e.g., 1.5 V (vs. Li/Li$^+$)), whereby the irreversible reaction between the positive electrodes 13 and 14 and the electrolyte solution can be avoided. Further, the reaction between the lithium ions and aluminum constituting the positive-electrode current collector can be avoided by setting the potential of the positive electrode to be not less than the predetermined potential (e.g., 1.5 V (vs. Li/Li$^+$)). Thus, the deterioration of the positive electrodes 13 and 14 can be prevented by adjusting the amount of the active material.

As shown in FIGS. 7A and 7B, energy can be emitted from the positive electrode 14 containing the activated carbon with a high current during the high-rate discharge. Since the positive electrode 14 containing the activated carbon is provided as described above, energy can be taken out from the positive electrode 14 with the high current by utilizing the high output characteristic of the activated carbon. Therefore, the output of the electric storage device 10 can be increased. Since the resistor 23 is provided in the electricity supply path 24 at the side of the positive electrode 13 so as to control the electric current, load to the positive electrode 13 containing the lithium cobaltate can be decreased. Accordingly, even when the high-rate discharge is executed, the load to the positive electrode 13 can be decreased, whereby the deterioration of the positive electrode 13 can be prevented. Consequently, the durability of the electric storage device 10, which has both the high capacity characteristic and high output characteristic, can be enhanced.

The negative-electrode current collector 16 arranged between the positive-electrode mixture layer 22 and the positive-electrode mixture layer 27 has a large number of through-holes 16a formed therein. Therefore, as shown in FIG. 7C, energy can be transferred from the positive electrode 13 to the positive electrode 14 during the high-rate discharge. This energy transfer is continued until the potential of the positive electrode 13 and the potential of the positive electrode 14 are balanced. Thus, the potential difference between the positive electrodes 13 and 14 connected to each other can be canceled, whereby the deterioration of the positive-electrode mixture layers 22 and 27 can be prevented.

Since the negative-electrode current collector 16 has a large number of through-holes 16a formed therein, energy can be replenished from the positive electrode 13 so as to recover the potential of the positive electrode 14, even if the potential of the positive electrode 14 temporarily decreases during the high-rate discharge. Thus, even if the potential of the positive electrode 14 temporarily decreases, the high-rate discharge can be continued. Specifically, the high-rate discharge can be repeated until the energy in the positive-electrode mixture layer 22 having a high capacity is exhausted. Accordingly, the capacity of the electric storage device 10 during the high-rate discharge can be increased.

As explained before, in the electric storage device 10, the electric storage component 29 having the high capacity characteristic and the electric storage component 30 having the high output characteristic are connected in parallel, and the negative-electrode current collector 16 arranged between the positive-electrode mixture layer 22 and the positive-electrode mixture layer 27 has a large number of through-holes 16a therein. By this structure, the high capacity characteristic of the lithium cobaltate can sufficiently be utilized during the low-rate discharge, while the increased capacity and increased output of the electric storage device 10 can be achieved during the high-rate discharge. Further, in the electric storage device 10, the resistor 23 is provided in the electricity supply path 24 of the electric storage component 30 having the high capacity characteristic. Thus, the deterioration of the electric storage device 10 during the high-rate discharge can be prevented.

Specifically, when the high-rate discharge is executed, the current rapidly flowing through the high-capacitive (high-resistance) electric storage component 29 becomes a cause of deteriorating the electric storage component 29 in the case where the electric storage component 29 having a high capacity and the electric storage component 30 having a high output are connected only in parallel. On the other hand, in the electric storage device 10 according to the present invention, the resistor 23 is provided in the electricity supply path 24 of the high-capacitive electric storage component 29, whereby the path resistance of the electric storage component 29 is set higher than the path resistance of the electric storage component 30. Therefore, the load applied to the high-capacitive positive-electrode mixture layer 22 can be decreased when the high-rate discharge is executed. Further, when the high-rate discharge is executed, the load applied to the negative-electrode mixture layer 17, which is opposite to the positive-electrode mixture layer 22, can be decreased. Thus, the deterioration of the electric storage component 29 during the high-rate discharge can be prevented.

The case in which the lithium cobaltate is employed as the positive-electrode active material having a high capacity is considered as a specific example. In this case, the swelling and contraction of the positive electrode containing the lithium cobaltate might cause the deterioration of the structure by the repeated execution of the high-rate discharge. However, the current to the positive electrode can be decreased by providing the resistor. Accordingly, the rapid change in the volume of the positive electrode containing the lithium cobaltate can be suppressed. Consequently, the deterioration of the positive electrode containing the lithium cobaltate can be delayed. Next, the case is considered in which a carbon material (e.g., hard carbon) is employed, as a negative-electrode active material, for the negative electrode opposite to the positive electrode containing the lithium cobaltate. In this case, the capacity of the positive electrode opposite to the negative electrode is high, so that the overcharge is caused with the high-rate charge. Therefore, the deposition of the metal lithium on the surface of the negative electrode might be generated. Further, since the capacity of the positive electrode opposite to the negative electrode is high, the overdischarge is caused with the high-rate discharge. Therefore, the elution of copper, which constitutes the negative-electrode current collector, might be generated. In view of this, the resistor is provided in order to decrease the current to the negative electrode. Accordingly, the lithium ions can be diffused to the other negative electrode before the negative electrode is in the overcharge state or in the overdischarge state. Consequently, the deterioration of the negative electrode opposite to the positive electrode having a high capacity can be prevented.

In the aforesaid description, the resistor 23 is provided to the electricity supply path 24. By the provision of the resistor 23, the path resistance of the high-capacitive electric storage component 29 is set higher than the path resistance of the high-output electric storage component 30. However, the invention is not limited to the configuration in which the resistor 23 is provided in the electricity supply path 24. For example, the electricity supply path 24 of the electric storage component 29 can be formed to be narrower than the electricity supply path 28 of the electric storage component 30. By this configuration, the resistance of the electricity supply path 24 can be increased. Therefore, the path resistance of the high-capacitive electric storage component 29 can be increased.

Figure 8:
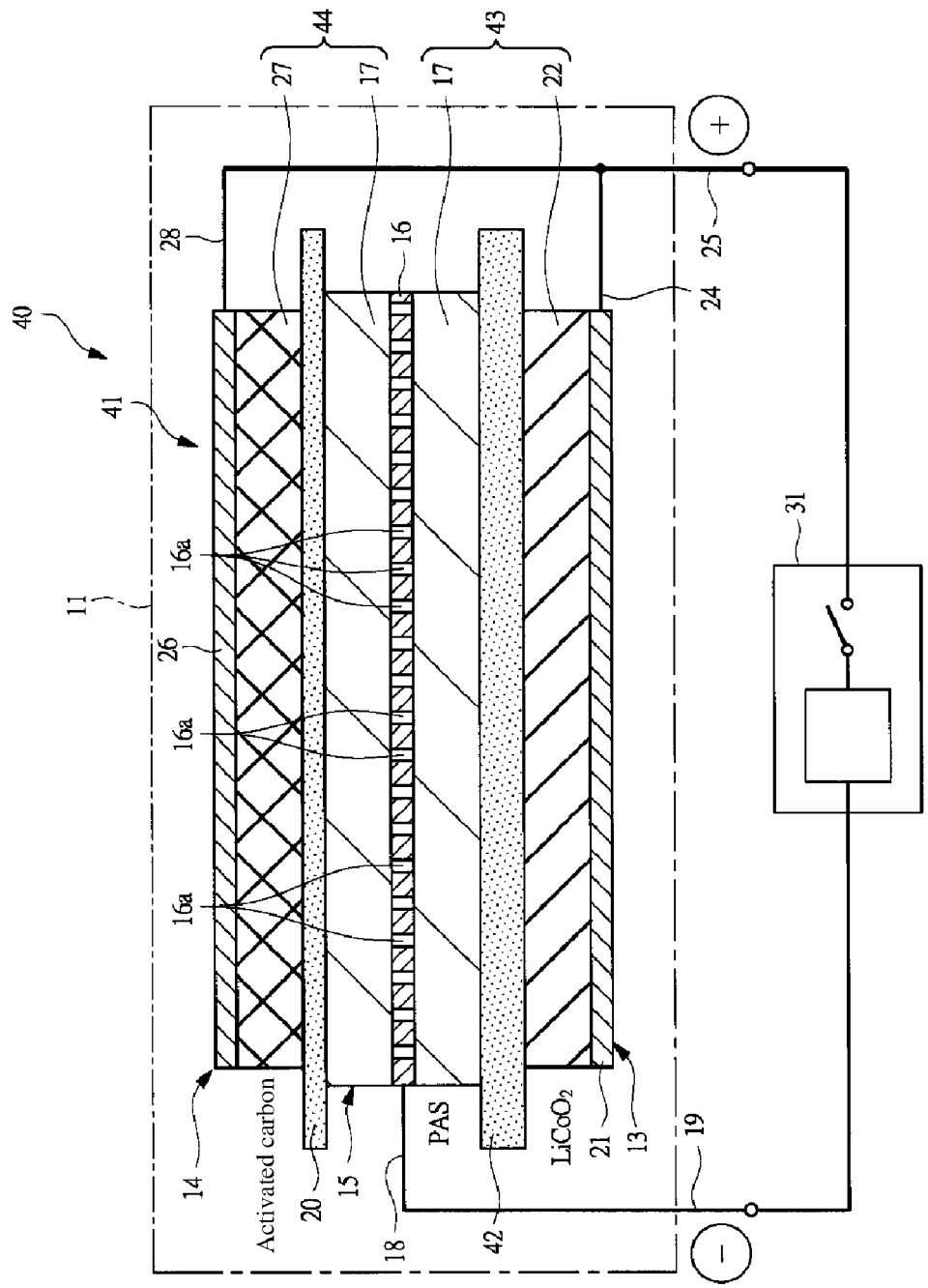
FIG. 8 is a sectional view schematically showing an internal structure of an electric storage device according to another embodiment of the present invention.
Figure 9:
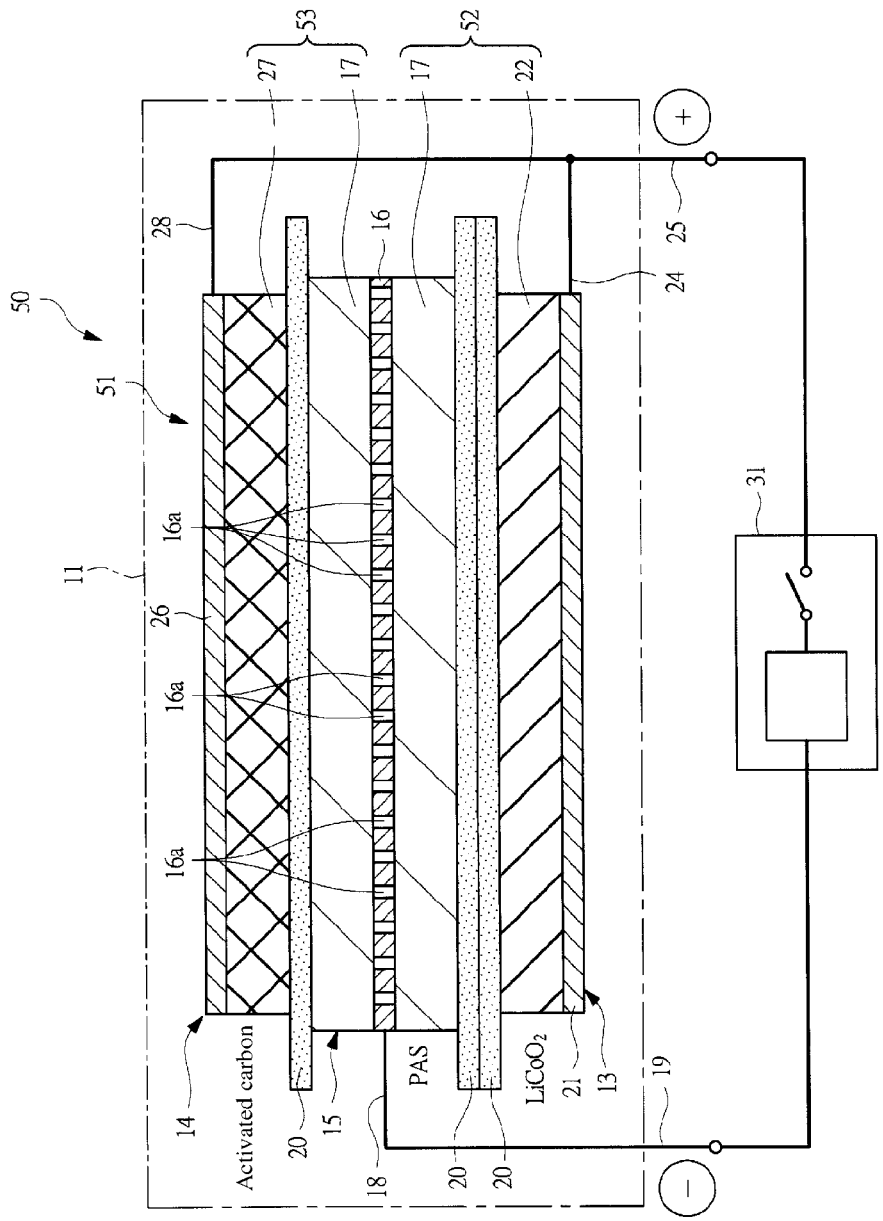
FIG. 9 is a sectional view schematically showing an internal structure of an electric storage device according to another embodiment of the present invention.

Next, another embodiment of the present invention will be explained. FIGS. 8 and 9 are sectional views each schematically showing the internal structure of electric storage devices 40 and 50 according to another embodiment of the present invention. The components same as those shown in FIG. 1 are identified by the same numerals, and the explanation thereof is omitted. As shown in FIG. 8, an electrode laminate unit 41 is arranged at the inside of a laminate film 11. A negative electrode 15 is arranged at the center of the electrode laminate unit 41. A positive electrode 13 is arranged so as to be opposite to one surface of the negative electrode 15. A separator 42 is provided between the positive electrode 13 and the negative electrode 15. The positive electrode 13 includes a positive-electrode current collector (current collector) 21 and a first positive-electrode mixture layer 22 coated on the positive-electrode current collector 21.

A positive electrode 14 is arranged so as to be opposite to the other surface of the negative electrode 15. A separator 20 is provided between the positive electrode 14 and the negative electrode 15. The positive electrode 14 includes a positive-electrode current collector (current collector) 26 and a second positive-electrode mixture layer 27 coated on the positive-electrode current collector 26. The separator 20 of the positive electrode 14 is formed to be thinner than the separator 42 of the positive electrode 13.

As described above, the electric storage device 40 has a first electric storage component 43 including the positive-electrode mixture layer 22 containing a lithium cobaltate and a negative-electrode mixture layer 17 opposite to the positive-electrode mixture layer 22. The thick separator 42 is provided between the positive-electrode mixture layer 22 and the negative-electrode mixture layer 17. The electric storage device 40 also has a second electric storage component 44 including the positive-electrode mixture layer 27 containing an activated carbon and a negative-electrode mixture layer 17 opposite to the positive-electrode mixture layer 27. The thin separator 20 is provided between the positive-electrode mixture layer 27 and the negative-electrode mixture layer 17. The first electric storage component 43 and the second electric storage component 44 are connected in parallel.

As described above, in the electric storage device 40, the separator 42 of the high-capacitive electric storage component 43 is formed to be thicker than the separator 20 of the high-output electric storage component 44. By this configuration, the path resistance of the high-capacitive electric storage component 43 can be set higher than the path resistance of the high-output electric storage component 44. Specifically, the separator 42 between the positive-electrode mixture layer 22 and the negative-electrode mixture layer 17 is formed to be thick, whereby the moving resistance of the lithium ions between the positive-electrode mixture layer 22 and the negative-electrode mixture layer 17 can be increased. Thus, even during the high-rate discharge, the movement of the lithium ions in the electric storage component 43 can be restricted. Accordingly, like the electric storage device 10, the load to the positive-electrode mixture layer 22 containing the lithium cobaltate in the electric storage device 40 can be decreased. Consequently, the deterioration of the positive-electrode mixture layer 22 and the negative-electrode mixture layer 17 can be prevented. Accordingly, the durability of the electric storage device 40 having the high capacity characteristic and the high output characteristic can be enhanced.

Next, another embodiment of the present invention will be explained. As shown in FIG. 9, an electrode laminate unit 51 is arranged at the inside of a laminate film 11. A negative electrode 15 is arranged at the center of the electrode laminate unit 51. A positive electrode 13 is arranged so as to be opposite to one surface of the negative electrode 15. Two separators 42 are provided between the positive electrode 13 and the negative electrode 15 as superimposed. The positive electrode 13 includes a positive-electrode current collector (current collector) 21 and a first positive-electrode mixture layer 22 coated on the positive-electrode current collector 21. A positive electrode 14 is arranged so as to be opposite to the other surface of the negative electrode 15. One separator 20 is provided between the positive electrode 14 and the negative electrode 15. The positive electrode 14 includes a positive-electrode current collector (current collector) 26 and a second positive-electrode mixture layer 27 coated on the positive-electrode current collector 26. As described above, the illustrated electric storage device 50 has a first electric storage component 52 including the positive-electrode mixture layer 22 containing a lithium cobaltate and a negative-electrode mixture layer 17 opposite to the positive-electrode mixture layer 22. Two separators 20 are provided between the positive-electrode mixture layer 22 and the negative-electrode mixture layer 17. The electric storage device 50 also has a second electric storage component 53 including the positive-electrode mixture layer 27 containing an activated carbon and a negative-electrode mixture layer 17 opposite to the positive-electrode mixture layer 27. One separator 20 is provided between the positive-electrode mixture layer 22 and the negative-electrode mixture layer 17. The first electric storage component 52 and the second electric storage component 53 are connected in parallel.

As described above, in the electric storage device 50, the number of the separator 20 of the high-capacitive electric storage component 52 is set larger than the number of the separator 20 of the high-output electric storage component 53. By this configuration, the path resistance of the high-capacitive electric storage component 52 can be set higher than the path resistance of the high-output electric storage component 53. Specifically, the larger number of the separator 20 between the positive-electrode mixture layer 22 and the negative-electrode mixture layer 17 is arranged, whereby the moving resistance of the lithium ions between the positive-electrode mixture layer 22 and the negative-electrode mixture layer 17 can be increased. Thus, even during the high-rate discharge, the movement of the lithium ions in the electric storage component 52 can be restricted. Accordingly, like the electric storage device 10, the load to the positive-electrode mixture layer 22 containing the lithium cobaltate in the electric storage device 50 can be decreased. Moreover, the load to the negative-electrode mixture layer 17 opposite to the positive-electrode mixture layer 22 containing the lithium cobaltate can be decreased. Consequently, the deterioration of the positive-electrode mixture layer 22 and the negative-electrode mixture layer 17 can be prevented. Accordingly, the durability of the electric storage device 50 having the high capacity characteristic and the high output characteristic can be enhanced. In this case, the number of the separator 20 is increased or decreased to change the path resistance. Thus, the specification of the separator 20 can be standardized, whereby the production cost can be lowered.

In the electric storage device 50 shown in FIG. 9, two separators 20 are arranged between the positive-electrode mixture layer 22 and the negative-electrode mixture layer 17. However, the number of the separator 20 is not limited to two. Three or more separators 20 can be arranged between the positive-electrode mixture layer 22 and the negative-electrode mixture layer 17. In the electric storage devices 40 and 50 shown in FIGS. 8 and 9, the path resistances of the high-capacitive electric storage components 43 and 52 are set higher than the path resistances of the high-output electric storage components 44 and 53 by changing the thickness or the number of the separators 20 and 42. However, the path resistance can be set higher by the other configuration, in addition to the configuration in which the thickness or the number of the separators 20 and 42 are changed. For example, a gap can be formed between the positive-electrode mixture layer 22 and the negative-electrode mixture layer 17 constituting the high-capacitive electric storage components 44 and 53. By this configuration, the path resistance of the high-capacitive electric storage components 44 and 53 can be set higher.

Figure 10:
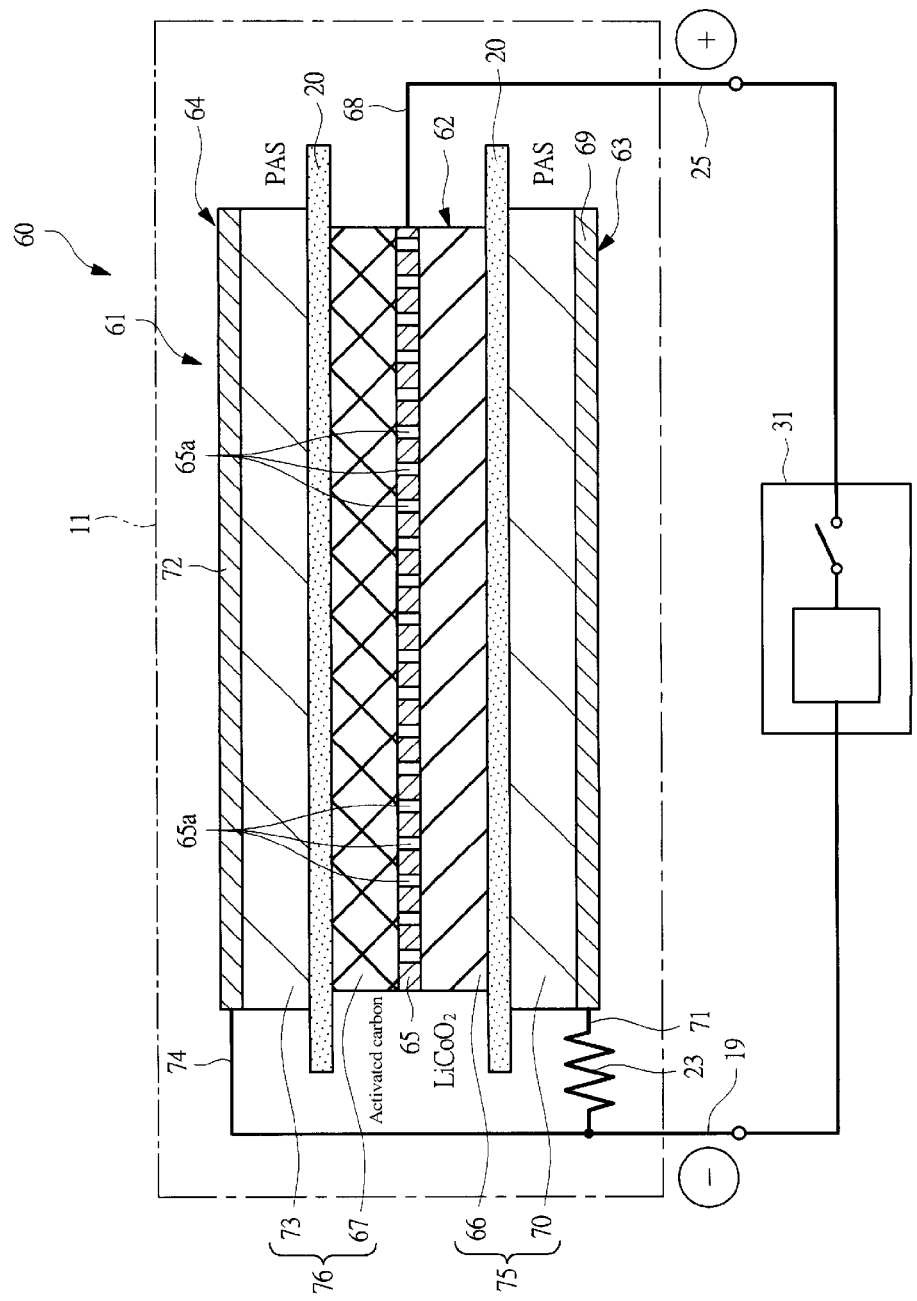
FIG. 10 is a sectional view schematically showing an internal structure of an electric storage device according to another embodiment of the present invention.

Next, another embodiment of the present invention will be explained. FIG. 10 is a sectional view schematically showing the internal structure of an electric storage device 60 according to another embodiment of the present invention. The components same as those shown in FIG. 1 are identified by the same numerals, and the explanation thereof are omitted.

As shown in FIG. 10, an electrode laminate unit 61 is arranged at the inside of a laminate film 11. The electrode laminate unit 61 is composed of one positive electrode 62 and two negative electrodes 63 and 64. The positive electrode 62 is arranged at the center of the electrode laminate unit 61. The positive electrode 62 has a positive-electrode current collector (current collector) having a large number of through-holes 65a formed therein. The positive-electrode current collector 65 is connected to a positive electrode terminal 25 via an electricity supply path 68. A first positive-electrode mixture layer 66 is coated on one surface of the positive-electrode current collector 65. A second positive-electrode mixture layer 67 is coated on the other surface of the positive-electrode current collector 65.

The negative electrode 63 is arranged so as to be opposite to one surface of the positive electrode 62. A separator 20 is provided between the positive electrode 62 and the negative electrode 63. The negative-electrode 63 is composed of a negative-electrode current collector (current collector) 69 and a negative-electrode mixture layer 70 coated on the negative-electrode current collector 69. The negative-electrode current collector 69 is connected to a negative electrode terminal 19 via an electricity supply path 71. A resistor 23 is provided in the electricity supply path 71. The negative electrode 64 is arranged so as to be opposite to the other surface of the positive electrode 62. A separator 20 is provided between the positive electrode 62 and the negative electrode 64. The negative electrode 64 is composed of a negative-electrode current collector (current collector) 72 and a negative-electrode mixture layer 73 coated on the negative-electrode current collector 72. The negative-electrode current collector 72 is connected to a negative electrode terminal 19 via an electricity supply path 74.

Like the aforesaid electric storage device 10, the positive-electrode mixture layer 66 contains a lithium cobaltate as a positive-electrode active material. The positive-electrode mixture layer 67 contains an activated carbon as the positive-electrode active material. The negative-electrode mixture layers 70 and 73 contain a PAS as a negative-electrode active material. As described above, the illustrated electric storage device 60 has a first electric storage component 75 including the positive-electrode mixture layer 66 containing the lithium cobaltate and the negative-electrode mixture layer 70 opposite to the positive-electrode mixture layer 66. The electric storage device 60 also has a second electric storage component 76 including the positive-electrode mixture layer 67 containing the activated carbon and the negative-electrode mixture layer 73 opposite to the positive-electrode mixture layer 67. The first electric storage component 75 and the second electric storage component 76 are connected in parallel.

As explained above, in the electric storage device 60, the electric storage component 75 having the high capacity characteristic and the electric storage component 76 having the high output characteristic are connected in parallel. By this configuration, the capacity and the output of the electric storage device 60 can be increased. In the electric storage device 60, the resistor 23 is provided in the electricity supply path 71 of the high-capacitive electric storage component 75 of the negative-electrode current collector 69. Thus, the deterioration of the electric storage device 60 during the high-rate charging/discharging can be prevented. The electric storage device 60 also has a structure in which the positive-electrode mixture layer 66 and the positive-electrode mixture layer 67 are adjacent to each other via the positive-electrode current collector 65. Therefore, the lithium ions can be moved rapidly between the positive-electrode mixture layers 66 and 67 after the high-rate charging/discharging.

Figure 11:
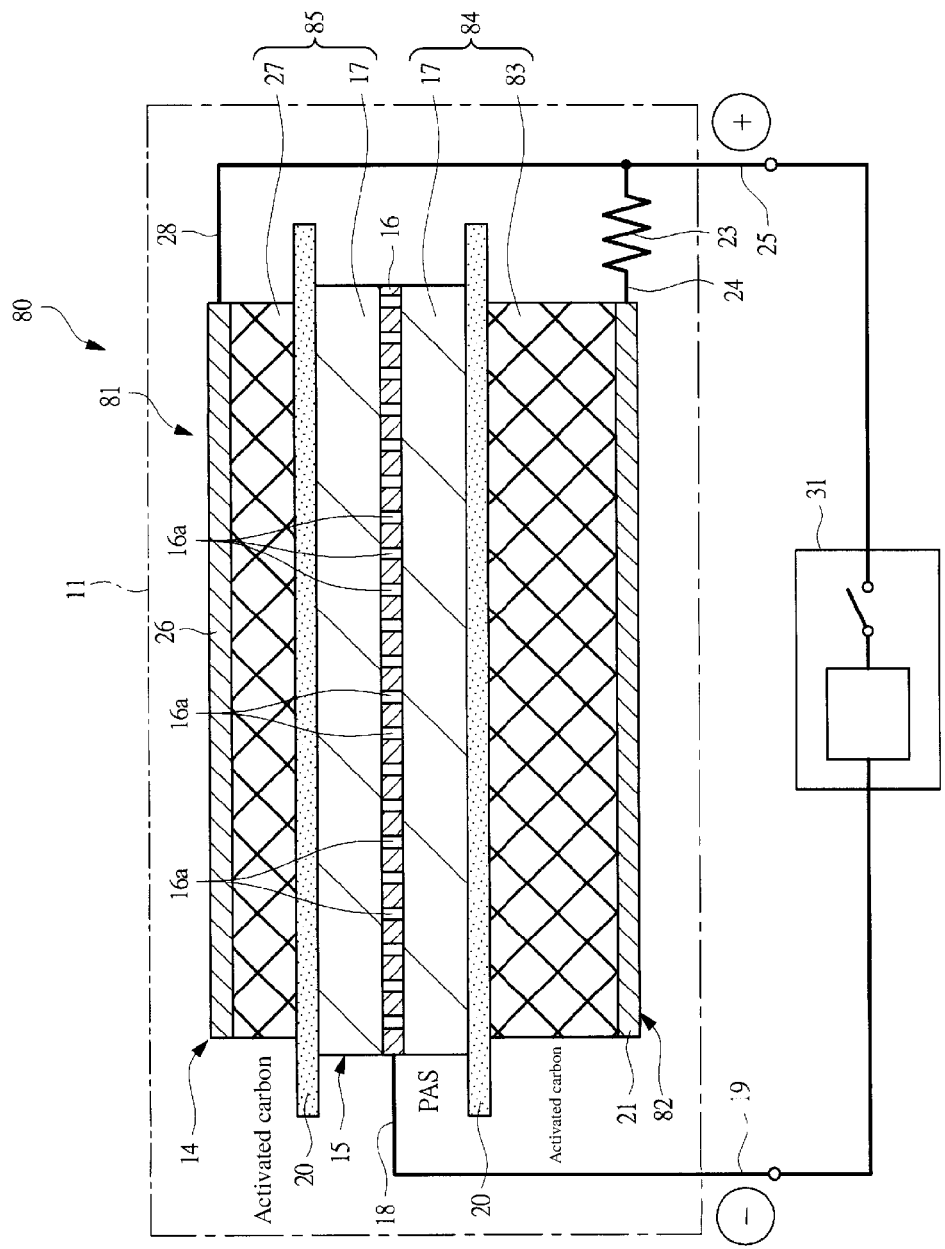
FIG. 11 is a sectional view schematically showing an internal structure of an electric storage device according to another embodiment of the present invention.

Next, another embodiment of the present invention will be explained. FIG. 11 is a sectional view schematically showing the internal structure of an electric storage device 80 according to another embodiment of the present invention. The components same as those shown in FIG. 1 are identified by the same numerals, and the explanation thereof are omitted.

As shown in FIG. 11, an electrode laminate unit 81 is arranged at the inside of a laminate film 11. A negative electrode 15 is arranged at the center of the electrode laminate unit 81. A positive electrode 82 is provided so as to be opposite to one surface of the negative electrode 15. A separator 20 is provided between the positive electrode 82 and the negative electrode 15. The positive electrode 82 is composed of a positive-electrode current collector (current collector) 21 and a first positive-electrode mixture layer 83 coated on the positive-electrode current collector 21. The positive-electrode current collector 21 is connected to a positive electrode terminal 25 via an electricity supply path 24. A resistor 23 is provided in the electricity supply path 24. A positive electrode 14 is arranged so as to be opposite to the other surface of the negative electrode 15. A separator 20 is provided between the positive electrode 14 and the negative electrode 15. The positive electrode 14 is composed of a positive-electrode current collector (current collector) 26 and a second positive-electrode mixture layer 27 coated on the positive-electrode current collector 26. The positive-electrode current collector 26 is connected to the positive electrode terminal 25 via an electricity supply path. The second positive-electrode mixture layer 27 is coated to be thin compared to the first positive-electrode mixture layer 83.

As described above, the illustrated electric storage device 80 has a first electric storage component 84 including the thick positive-electrode mixture layer 83 and the negative-electrode mixture layer 17 opposite to the positive-electrode mixture layer 83. The electric storage device 80 also has a second electric storage component 85 including the thin positive-electrode mixture layer 27 and the negative-electrode mixture layer 17 opposite to the positive-electrode mixture layer 27. The first electric storage component 84 and the second electric storage component 85 are connected in parallel. The same activated carbon is contained in the positive-electrode mixture layers 27 and 83 of the positive electrodes 14 and 82 as the positive-electrode active material. However, since the positive-electrode mixture layer 83 is coated to be thick, it has the higher capacity characteristic compared to the positive-electrode mixture layer 27. On the other hand, since the positive-electrode mixture layer 27 is coated to be thin, it has the higher output characteristic compared to the positive-electrode mixture layer 83.

As described above, the electric storage device 80 has the thick positive-electrode mixture layer 83 and the thin positive-electrode mixture layer 27. Thus, the capacity and output of the electric storage device 80 can be increased. In the electric storage device 80, the resistor 23 is provided in the electricity supply path of the high-capacitive electric storage component 84. By this structure, the deterioration of the electric storage device 80 during the high-rate charging/discharging can be prevented.

Figure 12:
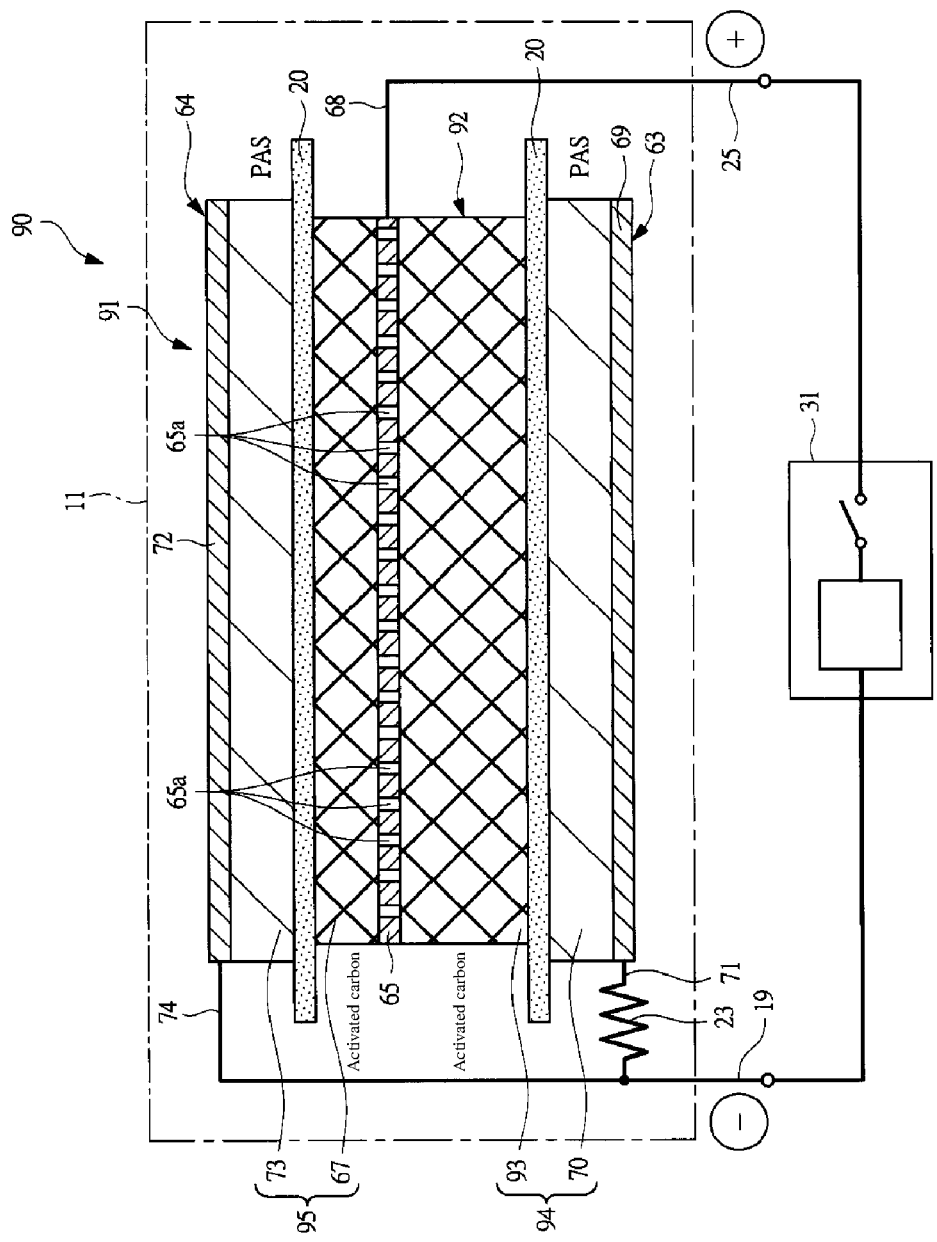
FIG. 12 is a sectional view schematically showing an internal structure of an electric storage device according to another embodiment of the present invention.

Next, another embodiment of the present invention will be explained. FIG. 12 is a sectional view schematically showing the internal structure of an electric storage device 90 according to another embodiment of the present invention. The components same as those shown in FIG. 10 are identified by the same numerals, and the explanation thereof are omitted.

As shown in FIG. 12, an electrode laminate unit 91 is arranged at the inside of a laminate film 11. The electrode laminate unit 91 is composed of one positive electrode 92 and two negative electrodes 63 and 64. The positive electrode 92 is arranged at the center of the electrode laminate unit 91. The positive electrode 92 has a positive-electrode current collector (current collector) 65 having a large number of through-holes 65a formed therein. The positive-electrode current collector 65 is connected to a positive electrode terminal 25 via an electricity supply path 68. A first positive-electrode mixture layer 93 is coated on one surface of the positive-electrode current collector 65. A second positive-electrode mixture layer 67 is coated on the other surface of the positive-electrode current collector 65. The second positive-electrode mixture layer 67 is coated to be thinner than the first positive-electrode mixture layer 93.

The negative electrode 63 is arranged so as to be opposite to one surface of the positive electrode 92. A separator 20 is provided between the positive electrode 92 and the negative electrode 63. The negative-electrode 63 is composed of a negative-electrode current collector (current collector) 69 and a negative-electrode mixture layer 70 coated on the negative-electrode current collector 69. The negative-electrode current collector 69 is connected to a negative electrode terminal 19 via an electricity supply path 71. A resistor 23 is provided in the electricity supply path 71. The negative electrode 64 is arranged so as to be opposite to the other surface of the positive electrode 92. A separator 20 is provided between the positive electrode 92 and the negative electrode 64. The negative electrode 64 is composed of a negative-electrode current collector (current collector) 72 and a negative-electrode mixture layer 73 coated on the negative-electrode current collector 72. The negative-electrode current collector 72 is connected to a negative electrode terminal 19 via an electricity supply path 74.

As described above, the illustrated electric storage device 90 has a first electric storage component 94 including the thick positive-electrode mixture layer 93 and the negative-electrode mixture layer 70 opposite to the positive-electrode mixture layer 93. The electric storage device 90 also has a second electric storage component 95 including the thin positive-electrode mixture layer 67 and the negative-electrode mixture layer 73 opposite to the positive-electrode mixture layer 67. The same activated carbon is contained in the positive-electrode mixture layers 67 and 93 of the positive electrode 92 as the positive-electrode active material. However, since the positive-electrode mixture layer 93 is coated to be thick, it has the higher capacity characteristic compared to the positive-electrode mixture layer 67. On the other hand, since the positive-electrode mixture layer 67 is coated to be thin, it has the higher output characteristic compared to the positive-electrode mixture layer 93.

As described above, the electric storage device 90 has the thick positive-electrode mixture layer 93 and the thin positive-electrode mixture layer 67. Thus, the capacity and output of the electric storage device 90 can be increased. In the electric storage device 90, the resistor 23 is provided in the electricity supply path 71 of the high-capacitive electric storage component 94. By this structure, the deterioration of the electric storage device 90 during the high-rate charging/discharging can be prevented.

Figure 13:
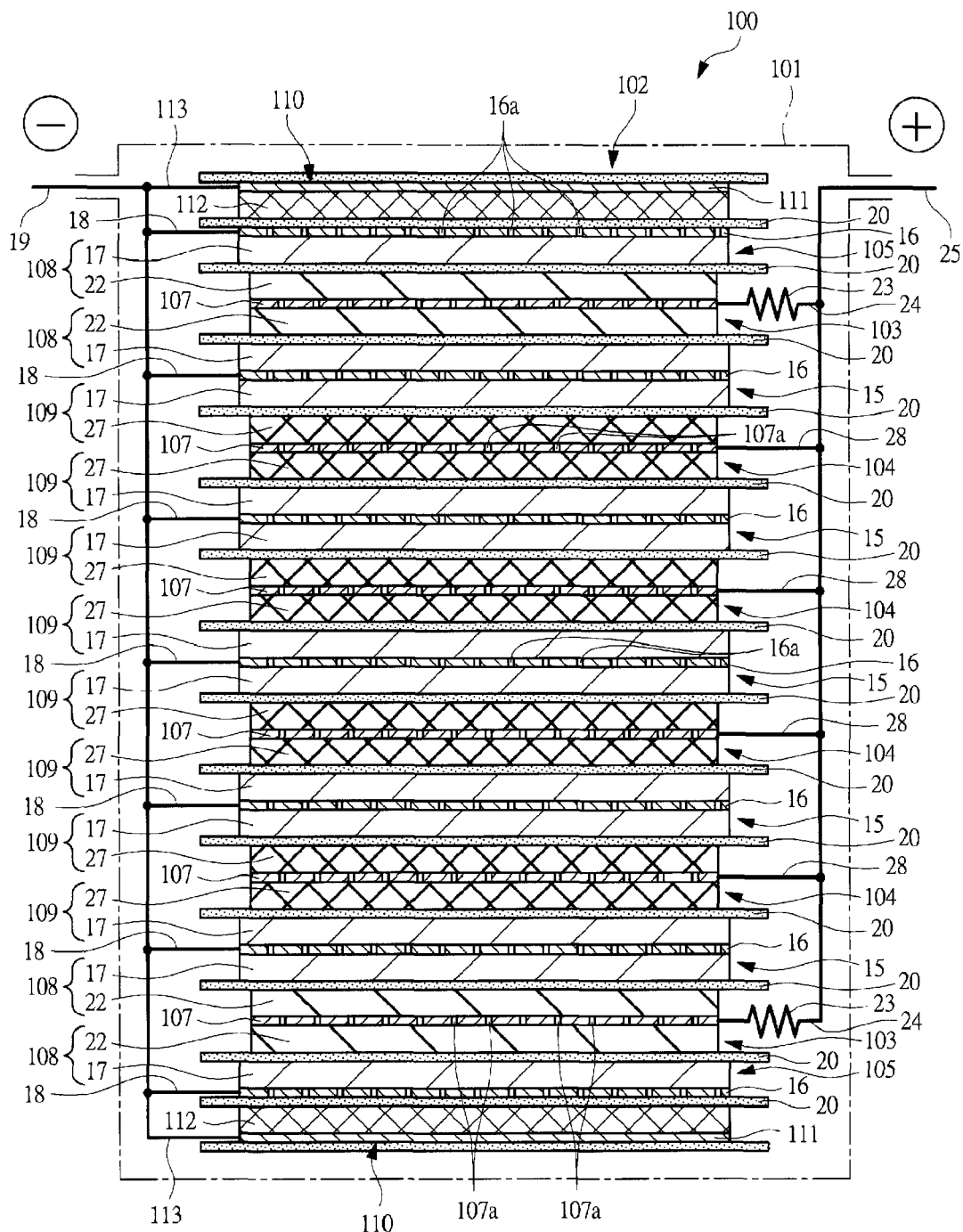
FIG. 13 is a sectional view schematically showing an internal structure of an electric storage device according to another embodiment of the present invention.

Next, another embodiment of the present invention will be explained. FIG. 13 is a sectional view schematically showing the internal structure of an electric storage device 100 according to another embodiment of the present invention. The components same as those shown in FIG. 1 are identified by the same numerals, and the explanation thereof are omitted.

As shown in FIG. 13, a laminate film 101 of the electric storage device 100 constitutes an outer casing. An electrode laminate unit 102 is arranged at the inside of the laminate film 101. This electrode laminate unit 102 is composed of a positive electrode system composed of six positive electrodes made of positive electrodes 103 and 104 and a negative electrode system composed of seven negative electrodes made of negative electrodes 15 and 105. Each of the positive electrodes 103 of the positive electrode system has a positive-electrode current collector (current collector) 107 provided with a large number of through-holes 107a, and first positive-electrode mixture layers 22 coated on both surfaces of the positive-electrode current collector 107. Each of the positive electrodes 104 of the positive electrode system has a positive-electrode current collector 107 provided with a large number of through-holes 107a, and second positive-electrode mixture layers 27 coated on both surfaces of the positive-electrode current collector 107. On the other hand, each of the negative electrodes 15 of the negative electrode system has a negative-electrode current collector 16 provided with a large number of through-holes 16a, and negative-electrode mixture layers 17 coated on both surfaces of the negative-electrode current collector 16. Each of the negative electrodes 105 of the negative electrode system has a negative-electrode current collector 16 provided with a large number of through-holes 16a, and a negative-electrode mixture layer 17 coated on one surface of the negative-electrode current collector 16. The positive electrodes 103 and 104 and the negative electrodes 15 and 105 are laminated in such a manner that the positive electrodes and the negative electrodes are alternately laminated. Separators 20 are provided respectively between the positive electrodes 103 and 104 and the negative electrodes 15 and 105. Specifically, the electric storage device 100 has a laminate-type device structure.

Like the electric storage device 10 described above, the positive-electrode mixture layers 22 contain a lithium cobaltate as a positive-electrode active material. The positive-electrode mixture layers 27 contain an activated carbon as the positive-electrode active material. The negative-electrode mixture layers 17 contain a PAS as a negative-electrode active material. A positive electrode terminal 25 is connected to the positive-electrode current collectors 107 supporting the positive-electrode mixture layers 22 via an electricity supply path 24. A resistor 23 is provided in the electricity supply path 24. The positive electrode terminal 25 is connected to the positive-electrode current collectors 107 supporting the positive-electrode mixture layers 27 via an electricity supply path 28. A negative electrode terminal 19 is connected to the negative-electrode current collectors 16 supporting the negative-electrode mixture layers 17 via an electricity supply path 18.

As described above, the illustrated electric storage device 100 has first electric storage components 108 each having the positive-electrode mixture layer 22 containing the lithium cobaltate and the negative-electrode mixture layer 17 opposite to the positive-electrode mixture layer 22. The electric storage device 100 also has second electric storage components 109 each having the positive-electrode mixture layer 27 containing an activated carbon and the negative-electrode mixture layer 17 opposite to the positive-electrode mixture layer 27. Each of the first electric storage components 108 and each of the second electric storage components 109 are connected in parallel.

A lithium ion source 110 is provided at the outermost part of the electrode laminate unit 102 so as to be opposite to the negative electrode 46. The separator 20 is provided between the negative electrode 46 and the lithium ion source 110. The lithium ion source 110 includes a lithium-electrode current collector 111 made of a conductive porous body such as a stainless steel mesh. The lithium ion source 110 also has a metal lithium 112 adhered onto the lithium-electrode current collector 111. The negative-electrode current collector 16 and the lithium-electrode current collector 111 are short-circuited via an electricity supply path 113. Accordingly, the lithium ions are eluted from the metal lithium 112 by injecting an electrolyte solution into the laminate film 101. Therefore, the lithium ions from the metal lithium 112 can be doped into the negative-electrode mixture layer 17.

By doping the lithium ions into the negative-electrode mixture layer 17, the potential of the negative electrode can be lowered. Specifically, the cell voltage can be increased, so that the capacity of the electric storage device 100 can be increased. A large number of through-holes 16a and 107a are formed on the negative-electrode current collectors 16 and the positive-electrode current collectors 107. The lithium ions can freely move between the electrodes via the through-holes 16a and 107a, whereby the lithium ions can be doped all over the laminated all negative-electrode mixture layers 17.

As described above, in the electric storage device 100, each of the electric storage components 108 having the high capacity characteristic and each of the electric storage components 109 having the high output characteristic are connected in parallel. By this configuration, the capacity and the output of the electric storage device 100 can be increased. In the electric storage device 100, the resistor 23 is provided in the electricity supply path 24 of the high-capacitive electric storage components 108. Thus, the deterioration of the electric storage device 100 during the high-rate charging/discharging can be prevented. The electric storage device 100 has the low-resistance positive-electrode mixture layers 27 at the center of the positive electrode system, while the high-capacitive positive-electrode mixture layers 22 is provided at the outermost part of the positive electrode system. By this configuration, the cooling effect of the positive-electrode mixture layers 22, which have the resistance higher than that of the positive-electrode mixture layers 27, can be enhanced. Accordingly, the deterioration of the electric storage device 100 can further be prevented. Although the laminate-type electric storage device 100 has been explained, the present invention is naturally applicable to a wound-type electric storage device in which the positive electrode and the negative electrode are wound as superimposed.

The components of the aforesaid each of the electric storage devices will be explained in detail in the order described below: [A] negative electrode, [B] positive electrode, [C] negative-electrode current collector and positive-electrode current collector, [D] separator, [E] electrolyte, [F] outer casing.

[A] Negative Electrode

The negative electrode has the negative-electrode current collector and the negative-electrode mixture layer coated on the negative-electrode current collector. The negative-electrode active material contained in the negative-electrode mixture layer is not particularly limited, so long as it allows ions to be reversibly doped thereinto and dedoped therefrom. Examples of the negative-electrode active material include graphite, various carbon materials, polyacene-based material, tin oxide, silicon oxide, and the like. The graphite and hard carbon material (non-graphitizable carbon) are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity.

The PAS has a polyacene skeletal structure. The ratio (H/C) of a number of hydrogen atoms to a number of carbon atoms is preferably within the range of not less than 0.05 and not more than 0.50. When the H/C of the PAS exceeds 0.50, the aromatic polycyclic structure is not sufficiently grown, so that the lithium ions cannot smoothly be doped or dedoped. Therefore, the charging/discharging efficiency of the electric storage device 10 might be decreased. When the H/C of the PAS is less than 0.05, the capacity of the electric storage device might be decreased.

The aforesaid negative-electrode active material such as PAS is formed into a powdery shape, a granular shape or short fibrous shape. This negative-electrode active material is mixed with a binder to form a slurry. The slurry containing the negative-electrode active material is coated on the negative-electrode current collector and the resultant is dried, whereby the negative-electrode mixture layer is formed on the negative-electrode current collector. Usable binders mixed with the negative-electrode active material include fluorine-containing resin such as polytetrafluoroethylene, polyvinylidene fluoride, and the like, thermoplastic resin such as polypropylene, polyethylene, polyacrylate, etc, and a rubber binder such as styrene butadiene rubber (SBR), and the like. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, and the like. A conductive material such as acetylene black, graphite, metal powder, and the like can appropriately be added to the negative-electrode mixture layer.

[B] Positive Electrode

The positive electrode has the positive-electrode current collector and the positive-electrode mixture layer coated on the positive-electrode current collector. The positive-electrode active material contained in the positive-electrode mixture layer is not particularly limited, so long as it allows ions to be reversibly doped thereinto and dedoped therefrom. Examples of the positive-electrode active materials include activated carbon, transition metal oxide, conductive polymer, polyacene-based substance, and the like.

For example, a lithium cobaltate ($LiCoO_2$) is contained as the positive-electrode active material in order to increase the capacity of the positive-electrode mixture layer in the aforesaid description. Examples of the other materials include a lithium-containing metal oxide represented by a chemical formula of $Li_xM_yO_z$ (x, y, z are positive numbers, M is a metal, or can be metals of two or more types), such as $Li_xCoO_2$, $Li_xNiO_2$, $Li_xMnO_2$, $Li_xFeO_2$, and the like, or a transition metal oxide such as cobalt, manganese, vanadium, titanium, nickel, etc, or a sulfide. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide. Further, iron phosphate, ruthenium oxide, inorganic sulfur, organic molecule containing sulfur atom involved in a redox, and a high-molecular material having, as a monomer, an organic molecule containing sulfur atom involved in a redox can be used as the positive-electrode active material. By using these materials, a further improvement can be expected in capacity, output, safety, and durability.

The activated carbon used as the positive-electrode active material for increasing the output of the positive-electrode mixture layers is made of an activated carbon grain that is subject to an alkali activation treatment and has a specific surface area of 600 m²/g or more. A phenolic resin, petroleum pitch, petroleum coke, coconut husk, coal-derived coke, and the like are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, potassium, and the like, wherein potassium hydroxide is more preferable. Examples of the methods of the alkali activation include the method in which a carbide and an activator are mixed, and then, the resultant is heated in an airflow of inert gas, the method in which an activator is carried on a raw material of an activated carbon beforehand, the resultant is heated, and then, a carbonizing process and activating process are performed, the method in which a carbide is activated with a gas activation by using water vapors, and then, the resultant is surface-treated with an alkali activator. The activated carbon to which the alkali activation treatment is performed is pulverized by means of a known pulverizer such as a ball mill or the like. The grain size generally used within a wide range can be applied. For example, it is preferable that $D_{50}$ is 2 μm or more, more preferably 2 to 50 μm, and most preferably 2 to 20 μm. Further, the activated carbon preferably having an average pore diameter of 10 nm or less and a specific surface area of 600 to 3000 m²/g is preferable. More preferably, an activated carbon having a specific surface area of 800 m²/g or more, particularly 1300 to 2500 m²/g is preferable.

The positive-electrode active material described above such as the lithium cobaltate or activated carbon is formed into a powdery shape, granular shape, short fibrous shape, and the like, and this positive-electrode active material is mixed with a binder to form a slurry. The slurry containing the positive-electrode active material is coated on the positive-electrode current collector and the resultant is dried, whereby the positive-electrode mixture layer is formed on the positive-electrode current collector. Usable binders mixed with the positive-electrode active material include rubber binder such as SBR, fluorine-containing resin such as polytetrafluoroethylene, polyvinylidene fluoride, and the like, thermoplastic resin such as polypropylene, polyethylene, polyacrylate, and the like. A conductive material such as acetylene black, graphite, metal powder, and the like can appropriately be added to the positive-electrode mixture layer.

[C] Positive-electrode Current Collector and Negative-electrode Current Collector The positive-electrode current collector and the negative-electrode current collector preferably have through holes penetrating therethrough. The current collector arranged between the first positive-electrode mixture layer and the second positive-electrode mixture layer preferably has through-holes so as not to hinder the movement of anions or lithium ions. Examples of the current collector having through-holes penetrating therethrough include an expanded metal, punching metal, net, expanded member, and the like. The shape and number of the through hole are not particularly limited, and they are appropriately set so long as they do not hinder the movement of the anions or lithium ions. Various materials generally proposed for a battery or a capacitor can be employed as the material of the negative-electrode current collector and the positive-electrode current collector. For example, stainless steel, copper, nickel, and the like can be used as the material of the negative-electrode current collector, and aluminum, stainless steel or the like can be used as the material of the positive-electrode current collector.

[D] Separator

A porous member or the like having durability with respect to the electrolyte solution, positive-electrode active material, negative-electrode active material, or the like, having an open cell and having no electron conductivity can be used for the separator. Generally, a cloth, nonwoven fabric, or porous body made of paper (cellulose), glass fiber, polyethylene, polypropylene, and the like is used. The thickness of the separator can appropriately be set considering the holding amount of the electrolyte solution, strength of the separator, or the like. The thickness of the separator is preferably thin in order to reduce the internal resistance of the battery.

[E] Electrolyte Solution

It is preferable that an aprotic organic solvent containing a lithium salt is used for the electrolyte solution from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, sulfolane, and the like, wherein these material are used singly or mixed with one another. Examples of the lithium salt include $LiClO_4$, $LiAsF_6$, $LiBF_4$, $LiPF_6$, $LiN(C_2F_5SO_2)_2$, and the like. Further, the concentration of the electrolyte in the electrolyte solution is preferably set to at least 0.1 mol/L or more, and more preferably set within the range of 0.5 to 1.5 mol/L, in order to decrease the internal resistance due to the electrolyte solution.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), and the like. Examples of the anions include bis(fluorosulfonyl)-imide (FSI), bis(trifluoromethanesulfonyl)-imide (TFSI), $PF_6$—$BF_4$—, and the like.

[F] Outer Casing

Various materials generally used for a battery can be used for the outer casing. A metal material such as iron or aluminum can be used, and a film material or the like made of resin can be used. The shape of the outer casing is not particularly limited. The outer casing can be formed into a shape appropriately selected according to the purpose, such as a cylindrical shape or rectangular shape. From the viewpoint of miniaturization or reduced weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention will be explained in detail with reference to examples.

EXAMPLES

Example 1

[Fabrication of Negative Electrode 1]

A phenolic resin molded plate with a thickness of 0.5 mm was put into a Siliconit electric furnace and heat-treated under a nitrogen atmosphere at a rate of 50° C./hour till temperature reached 500° C., and further heat-treated at the rate of 10° C./hour till temperature reached 700° C., whereby a PAS plate was synthesized. The PAS plate thus synthesized was pulverized with a disc mill into PAS powders. The PAS powders had a H/C ratio of 0.17.

Then, 100 parts by weight of the above PAS powder and a solution prepared by dissolving 10 parts by weight of polyvinylidene fluoride powder in 80 parts by weight of N-methyl pyrrolidone were sufficiently mixed to prepare a slurry 1 for the negative electrode. The slurry 1 for the negative electrode was coated uniformly over both surfaces of a copper expanded metal (manufactured by Nippon Metal Industry Co., Ltd.) having a thickness of 32 μm (porosity of 50%) by a die coater. The slurry 1 for the negative electrode coated on the copper expanded metal was then dried and pressed, whereby a negative electrode 1 with a thickness of 80 μm was synthesized.

[Fabrication of Positive Electrode 1]

92 parts by weight of commercially available $LiCoO_2$ powder, 4.5 parts by weight of graphite powder, and 3.5 parts by weight of polyvinylidene fluoride (PVdF) powder were mixed, and then, N-methylpyrrolidone was added thereto. The mixture was thoroughly stirred and defoamed, whereby a slurry 1 for the positive electrode was synthesized prepared. Both surfaces of an aluminum expandable metal (manufactured by Nippon Metal Industry Co., Ltd.) having a thickness of 35 μm (porosity of 50%) were coated with a non-aqueous carbon conductive coating (EB-815, manufactured by Acheson (Japan) Limited) by a spraying method. The carbon conductive coating coated on the aluminum expandable metal was dried thereby to prepare a positive-electrode current collector having a conductive layer thereon. The total thickness (the sum of the thickness of the base material and the thickness of the conductive layer) of the positive-electrode current collector was 52 μm. Most of the through-holes of the positive-electrode current collector were filled with the conductive coating. The slurry 1 for the positive electrode was uniformly applied over both surfaces of the positive-electrode current collector by means of a roll coater. The slurry 1 for the positive electrode coated on the positive-electrode current collector was then dried and pressed to obtain a positive electrode 1 having a thickness of 170 μm.

[Fabrication of Positive Electrode 2]

A slurry 2 for the positive electrode was prepared by thoroughly mixing 85 parts by weight of commercially available activated carbon powder having a specific surface area of 2000 m²/g, 5 parts by weight of acetylene black powder, 6 parts by weight of acrylic resin binder, 4 parts by weight of carboxymethyl cellulose, and 200 parts by weight of water. The prepared slurry 2 for the positive electrode was uniformly coated on both surfaces of the positive-electrode current collector by means of a roll coater. The slurry 2 for the positive electrode coated on the positive-electrode current collector was then dried and pressed to obtain a positive electrode 2 having a thickness of 170 μm.

[Fabrication of Electrode Laminate Unit 1]

The negative electrode 1 was cut out into nine pieces, each having an area of 6.0 cm×7.5 cm (excluding the terminal welding part). The positive electrode 1 was cut out into two pieces, each having an area of 5.8 cm×7.3 cm (excluding the terminal welding part). The positive electrode 2 was cut out into six pieces, each having an area of 5.8 cm×7.3 cm (excluding the terminal welding part). A resistor of 10Ω was connected between the positive-electrode current collector and the terminal welding part of the positive electrode 1. The positive electrodes 1, the negative electrode 1, and the positive electrode 2 were laminated in such a way that the positive electrodes and the negative electrodes are alternately laminated through a separator of a nonwoven fabric made of polyethylene with a thickness of 35 μm in a manner that the terminal welding parts of the positive-electrode current collectors and the negative-electrode current collectors were set in the opposite side. The negative electrode 1 was the outermost electrode of the electrode laminate unit 1, and the positive electrode 1 was the outermost positive electrode. Then, separators were arranged at the uppermost part and the lowermost part, and the four sides of the laminate structure were fastened with a tape. The terminal welding parts (eight sheets) of the positive-electrode current collectors were ultrasonically welded to an aluminum positive electrode terminal (having a width of 50 mm, a length of 50 mm, a thickness of 0.2 mm), and the terminal welding parts (nine sheets) of the negative-electrode current collectors were ultrasonically welded to a copper negative electrode terminal (having a width of 50 mm, length of 50 mm, thickness of 0.2 mm), thereby to obtain an electrode laminate unit 1. The electrode laminate unit 1 was configured such that the positive electrode 1 was connected to the positive electrode terminal through the resistor, while the positive electrode 2 was connected to the positive electrode terminal not through the resistor.

[Fabrication of Cell 1]

The lithium electrode (lithium ion source) was prepared by pressing a metal lithium foil onto a stainless steel mesh with a thickness of 80 μm. A lithium electrode was located on the upper part of the electrode laminate unit 1 such that it exactly faced the negative electrode 1, and another lithium electrode was located on the lower part thereof in the same fashion, whereby a three-electrode laminate unit was fabricated. The terminal welding parts (two sheets) of the stainless mesh serving as the lithium-electrode current collector were resistance-welded to the negative electrode terminal welding parts.

The three-electrode laminate unit was placed in a laminate film deep-drawn by 3.5 mm, and the opening portion of the laminate film was covered with other laminate film and three sides were heat-sealed. Then, the unit was vacuum-impregnated with an electrolyte solution (solution formed by dissolving $LiPF_6$ at 1 mol/L into a solvent mixture containing ethylene carbonate, diethyl carbonate and propylene carbonate at the weight ratio of 3:4:1). Then, the remaining one side of the unit was heat-sealed to assemble four cells 1. The amount of the metal lithium located in each cell 1 was equivalent to 380 mAh/g per negative-electrode active material weight.

[Initial Evaluation of Cell 1]

The thus assembled cells 1 were left for 20 days, and one cell of four cells was disassembled. It was confirmed that no metal lithium remained. From this fact, it was considered that the amount of lithium ion equivalent to 380 mAh/g per negative-electrode active material weight was pre-doped.

[Characteristic Evaluation of Cell 1]

The cell 1 was charged at a constant current of 100 mA till the cell voltage reached 4.0 V, and then the cell 1 was charged by applying a constant voltage of 4.0 V. This constant-current constant-voltage charging method was performed for 6 hours. Then, the cell was discharged at a constant current of 100 mA till the cell voltage reached 2.0 V. The cycle of the charging operation (100 mA charge) to 4.0 V and the discharging operation (100 mA discharge) to 2.0 V was repeated, and when the cycle was repeated 10 times, the capacity and the energy density of the cell were evaluated. Subsequently, the cell was charged in a similar way, and was discharged at a constant current of 20 A till the cell voltage reached 2.0 V. The cycle of the charging operation (100 mA charge) to 4.0 V and the discharging operation (20 A discharge) to 2.0 V was repeated, and when the cycle was repeated 10 times, the capacity of the cell was evaluated. The results of the evaluation are shown in Table 1. The data pieces in Table 1 are the average values of three cells.

TABLE 1

| | Cell capacity (100 mA charge - 100 mA discharge) [mAh] | Energy density [Wh/L] | Cell capacity (100 mA charge - 20 A discharge) [mAh] |
|---|---|---|---|
| Example 1 | 325 | 64 | 79 |
| Comparative Example 1 | 325 | 64 | 84 |
| Example 2 | 325 | 63 | 80 |

The cell 1 was charged at a constant current of 20 A till the cell voltage reached 4.0 V, and then the cell 1 was charged by applying a constant voltage of 4.0 V. This constant-current constant-voltage charging method was performed for 6 hours. Then, the cell was discharged at a constant current of 20 A till the cell voltage reached 2.0 V. The cycle of the charging operation (20 A charge) to 4.0 V and the discharging operation (20 A discharge) to 2.0 V was repeated, and when the cycle was repeated 10 times, the capacity of the cell was evaluated. The results of the evaluation are shown in Table 2 together with the results of the cycle of the charging operation (100 mA charge) to 4.0 V and the discharging operation (20 A discharge) to 2.0 V. The data in Table 2 are the average values of three cells.

TABLE 2

| | Cell capacity (100 mA charge - 20 A discharge) [mAh] | Cell capacity (20 A charge - 20 A discharge) [mAh] |
|---|---|---|
| Example 1 | 79 | 74 |
| Comparative Example 1 | 84 | 68 |
| Example 2 | 80 | 75 |

Comparative Example 1

[Fabrication of Cell 2]

Four cells 2 were assembled in the same manner as in the Example 1 except that the resistor is not connected between the positive-electrode current collector and the terminal welding part. The amount of the metal lithium located in each cell 2 was equivalent to 380 mAh/g per negative-electrode active material weight.

[Initial Evaluation of Cell 2]

The thus assembled cells 2 were left for 20 days, and one cell of four cells was disassembled. It was confirmed that no metal lithium remained. From this fact, it was considered that the amount of lithium ion equivalent to 380 mAh/g per negative-electrode active material weight was pre-doped.

[Characteristic Evaluation of Cell 2]

The cell 2 was charged at a constant current of 100 mA till the cell voltage reached 4.0 V, and then the cell 2 was charged by applying a constant voltage of 4.0 V. This constant-current constant-voltage charging method was performed for 6 hours. Then, the cell was discharged at a constant current of 100 mA till the cell voltage reached 2.0 V. The cycle of the charging operation (100 mA charge) to 4.0 V and the discharging operation (100 mA discharge) to 2.0 V was repeated, and when the cycle was repeated 10 times, the capacity and the energy density of the cell were evaluated. Subsequently, the cell was charged in a similar way, and was discharged at a constant current of 20 A till the cell voltage reached 2.0 V. The cycle of the charging operation (100 mA charge) to 4.0 V and the discharging operation (20 A discharge) to 2.0 V was repeated, and when the cycle was repeated 10 times, the capacity of the cell was evaluated. The results of the evaluation are shown in Table 1. The data in Table 1 are the average values of three cells.

The cell 2 was charged at a constant current of 20 A till the cell voltage reached 4.0 V, and then the cell 2 was charged by applying a constant voltage of 4.0 V. This constant-current constant-voltage charging method was performed for 6 hours. Then, the cell was discharged at a constant current of 20 A till the cell voltage reached 2.0 V. The cycle of the charging operation (20 A charge) to 4.0 V and the discharging operation (20 A discharge) to 2.0 V was repeated, and when the cycle was repeated 10 times, the capacity of the cell was evaluated. The results of the evaluation are shown in Table 2 together with the results of the cycle (100 mA charge, 20 A discharge) of the charging operation to 4.0 V and the discharging operation to 2.0 V. The data in Table 2 are the average values of three cells.

Example 2

[Fabrication of Cell 3]

Four cells 3 were assembled in the same manner as in the Example 1, except that ten sheets of non-woven fabric made of polyethylene with a thickness of 35 μm, which were used as the separator, were arranged between the positive electrode 1 and the negative electrode 2. Specifically, ten separators were superimposed between the positive electrode 1 and the negative electrode 1, while one separator was arranged between the positive electrode 2 and the negative electrode 1. The amount of the metal lithium located in each cell 3 was equivalent to 380 mAh/g per negative-electrode active material weight.

[Initial Evaluation of Cell 3]

The thus assembled cells 3 were left for 30 days, and one cell of four cells 3 was disassembled. It was confirmed that no metal lithium remained. From this fact, it was considered that the amount of lithium ion equivalent to 380 mAh/g per negative-electrode active material weight was pre-doped.

[Characteristic Evaluation of Cell 3]

The cell 3 was charged at a constant current of 100 mA till the cell voltage reached 4.0 V, and then the cell 3 was charged by applying a constant voltage of 4.0 V. This constant-current constant-voltage charging method was performed for 6 hours. Then, the cell was discharged at a constant current of 100 mA till the cell voltage reached 2.0 V. The cycle of the charging operation (100 mA charge) to 4.0 V and the discharging operation (100 mA discharge) to 2.0 V was repeated, and when the cycle was repeated 10 times, the capacity and the energy density of the cell were evaluated. Subsequently, the cell was charged in a similar way, and was discharged at a constant current of 20 A till the cell voltage reached 2.0 V. The cycle of the charging operation (100 mA charge) to 4.0 V and the discharging operation (20 A discharge) to 2.0 V was repeated, and when the cycle was repeated 10 times, the capacity of the cell was evaluated. The results of the evaluation are shown in Table 1. The data in Table 1 are the average values of three cells.

The cell 3 was charged at a constant current of 20 A till the cell voltage reached 4.0 V, and then the cell 3 was charged by applying a constant voltage of 4.0 V. This constant-current constant-voltage charging method was performed for 6 hours.

Then, the cell was discharged at a constant current of 20 A till the cell voltage reached 2.0 V. The cycle of the charging operation (20 A charge) to 4.0 V and the discharging operation (20 A discharge) to 2.0 V was repeated, and when the cycle was repeated 10 times, the capacity of the cell was evaluated. The results of the evaluation are shown in Table 2 together with the results of the cycle of the charging operation (100 mA charge) to 4.0 V and the discharging operation (20 A discharge) to 2.0 V. The data in Table 2 are the average values of three cells.

Comparison of Example 1, Example 2, and Comparative Example 1

When the cells in the Examples 1 and 2 and the Comparative Example 1 were disassembled, it was confirmed that the metal lithium was slightly deposited on the surface of the negative electrode 1 opposite to the positive electrode 1 in the Comparative Example 1. On the other hand, it was confirmed that no metal lithium was deposited on the surface of the negative electrode 1 in the Examples 1 and 2. As shown in Table 2, it was considered that the capacity after 10 cycles with 20 A charge was reduced, since the metal lithium was deposited on the surface of the negative electrode 1 in the Comparative Example 1.

In the Comparative Example 1, the current through the positive electrode 1 was not controlled by the resistor. Therefore, it was considered that a load was applied to the negative electrode 1 opposite to the positive electrode 1 during a high-current charge. On the other hand, the current through the positive electrode 1 was controlled by the resistor of 10Ω in the Example 1. Therefore, it was considered that a large current did not flow through the positive electrode 1 even when the device was charged with a high current, with the result that the load applied to the negative electrode opposite to the positive electrode 1 was smaller than that in the Comparative Example 1. Similarly, the resistance of 10 separators arranged at each surface of the positive electrode 1 was high in the Example 2, it was considered that an abrupt movement of ions was restricted and a high current did not flow, resulting in that the load applied to the negative electrode 1 opposite to the positive electrode 1 was smaller than that in the Comparative Example 1.

Example 3

[Evaluation of Overdischarge Characteristic of Cell 1]

The cell 1 was charged at a constant current of 100 mA till the cell voltage reached 4.0 V, and then the cell 1 was charged by applying a constant voltage of 4.0 V. This constant-current constant-voltage charging method was performed for 6 hours. Then, the cell was discharged at a constant current of 100 mA till the cell voltage reached 0 V. The cycle of the charging operation (100 mA charge) to 4.0 V and the discharging operation (100 mA discharge) to 0 V was repeated, and when the cycle was repeated 10 times, no trouble such as swelling of the cell was not observed.

Comparative Example 2

[Evaluation of Overdischarge Characteristic of Cell 2]

The cell 2 was charged at a constant current of 100 mA till the cell voltage reached 4.0 V, and then the cell 2 was charged by applying a constant voltage of 4.0 V. This constant-current constant-voltage charging method was performed for 6 hours. Then, the cell was discharged at a constant current of 100 mA till the cell voltage reached 0 V. The cycle of the charging operation (100 mA charge) to 4.0 V and the discharging operation (100 mA discharge) to 0 V was repeated, and when the cycle was repeated 10 times, the trouble was caused, i.e., the cell was swelled and the internal resistance was increased.

Comparison of Example 3 and Comparative Example 2

When the cells in the Example 3 and the Comparative Example 2 were disassembled, no abnormality was observed in the cell 1 according to the Example 3. On the other hand, in the cell 2 according to the Comparative Example 2, metals that were supposed to be copper, and black matters were observed on the surface of the negative electrode and the surface of the positive electrode.

In the Example 3, the current through the positive electrode 1 was controlled by the resistor of 10Ω, so that the cell voltage reached 0 V without a high current through the positive electrode 1 during the discharge. Therefore, the negative electrode opposite to the positive electrode 1 was not overdischarged, and hence, it was considered that the lithium ions could smoothly be moved from the other negative electrode to the negative electrode opposite to the positive electrode 1. On the other hand, in the Comparative Example 2, the current through the positive electrode 1 was not controlled by the resistor. Therefore, a high current flew through the positive electrode 1, and the cell voltage reached 0V during the discharge. Accordingly, the movement of the lithium ions from the other negative electrode to the negative electrode opposite to the positive electrode 1 could not keep up with the high current, and hence, it was considered that the negative electrode opposite to the positive electrode 1 was overdischarged to 3.0 V or more.

When the negative electrode becomes 3.0 V or more, the copper serving as the current collector is oxidized and ionized to be deposited onto the surface of the positive electrode. The copper deposited on the surface of the positive electrode is again oxidized and ionized due to the charge, to thereby be deposited again onto the surface of the negative electrode. It is considered that the trouble such as the decomposition of the electrolyte was caused during the repeated process of the ionization and deposition of copper. Probably, unless the charge current or discharge current is lowered, the trouble caused by the overdischarge cannot be avoided in the cell 2 in the Comparative Example 2 in which the current through the positive electrode 1 is not controlled by the resistor.

The present invention is not limited to the aforesaid embodiments, and various modifications are possible without departing from the scope of the present invention. For example, the positive-electrode active material and the negative-electrode active material are not limited to the aforesaid active materials. Various active materials used for a conventional battery or a capacitor is applicable. Further, various electrolyte solutions and separators used for a conventional battery or a capacitor can also be used for the electrolyte solution and the separator.

The electric storage device according to the present invention has high output characteristic and high capacity characteristic, and further has high durability. Therefore, the electric storage device according to the present invention is largely effective as a driving storage power source or an auxiliary storage power source for an electric vehicle, hybrid vehicle, or the like. Further, the electric storage device according to the present invention is well adaptable to a driving storage power source for an electric vehicle, motorized wheel chair, or the like, a storage power source used in a photovoltaic power generating device or a wind power generating device, or a storage power source used in a portable device or an electric appliance.

What is claimed is:

1. An electric storage device comprising:
a first electric storage component including a first positive-electrode mixture layer and a negative-electrode mixture layer opposite to the first positive-electrode mixture layer; and
a second electric storage component that is connected in parallel to the first electric storage component and includes a second positive-electrode mixture layer and a negative-electrode mixture layer opposite to the second positive-electrode mixture layer, wherein
the positive-electrode mixture layer contains a positive-electrode active material that allows ions to be reversibly doped thereinto and dedoped therefrom,
the negative-electrode mixture layer contains a negative-electrode active material that allows ions to be reversibly doped thereinto and dedoped therefrom,
the capacity of the first positive-electrode mixture layer is set higher than the capacity of the second positive-electrode mixture layer, the path resistance of the first electric storage component is set higher than the path resistance of the second electric storage component, and
a current collector provided between the first positive-electrode mixture layer and the second positive-electrode mixture layer has a through-hole formed therein.

2. An electric storage device according to claim 1, wherein a resistor is provided in an electricity supply path of the first electric storage component so as to set the path resistance of the first electric storage component to be higher than the path resistance of the second electric storage component.

3. An electric storage device according to claim 1, wherein a separator arranged between the first positive-electrode mixture layer and the negative-electrode mixture layer is formed to be thicker than a separator arranged between the second positive-electrode mixture layer and the negative-electrode mixture layer, in order to set the path resistance of the first electric storage component to be higher than the path resistance of the second electric storage component.

4. An electric storage device according to claim 1, wherein the number of separators arranged between the first positive-electrode mixture layer and the negative-electrode mixture layer is set to be larger than the number of separators arranged between the second positive-electrode mixture layer and the negative-electrode mixture layer, whereby the path resistance of the first electric storage component is set higher than the path resistance of the second electric storage component.

5. An electric storage device according to claim 1, wherein the electricity supply path of the second electric storage component is set to be smaller than the electricity supply path of the first electric storage device so as to set the path resistance of the first electric storage component to be higher than the path resistance of the second electric storage component.

6. An electric storage device according to claim 1, wherein a gap is formed between the first positive-electrode mixture layer and the negative-electrode mixture layer in the first electric storage component so as to set the path resistance of the first electric storage component to be higher than the path resistance of the second electric storage component.

7. An electric storage device according to claim 1, wherein when the device includes plural first positive-electrode mixture layers and at least one or more second positive-electrode mixture layer, the outermost positive-electrode mixture layer is defined as the first positive-electrode mixture layer.

8. An electric storage device according to claim 1, wherein a lithium ion source is provided to be opposite to the negative electrode including the first negative-electrode mixture layer, wherein lithium is doped into the negative-electrode mixture layer from the lithium ion source.

9. An electric storage device according to claim 1, wherein the device structure is a laminate type or a wound type.

10. An electric storage device according to claim 1, wherein
different types of positive-electrode active materials are used for the first positive-electrode mixture layer and the second positive-electrode mixture layer, wherein the capacity of the first positive-electrode mixture layer is set higher than the capacity of the second positive-electrode mixture layer.

11. An electric storage device according to claim 1, wherein
the same type of positive-electrode active material is used for the first positive-electrode mixture layer and the second positive-electrode mixture layer, and the first positive-electrode mixture layer is coated to be thicker than the second positive-electrode mixture layer so as to set the capacity of the first positive-electrode mixture layer to be higher than the capacity of the second positive-electrode mixture layer.

12. An electric storage device according to claim 10, wherein
the positive-electrode active material contained in the first positive-electrode mixture layer and the second positive-electrode mixture layer is selected from an activated carbon, conductive polymer, polyacene-based material, lithium-containing metal oxide, transition metal oxide, transition metal sulfide, iron phosphate, ruthenium oxide, inorganic sulfur, organic molecule containing sulfur atom involved in a redox, and a high-molecule material that has, as a monomer, an organic molecule containing sulfur atom involved in a redox.

13. An electric storage device according to claim 10, wherein
the positive-electrode active material contained in the first positive-electrode mixture layer is $LiCoO_2$, and the positive-electrode active material contained in the second positive-electrode mixture layer is an activated carbon.

14. An electric storage device according to claim 13, wherein the negative-electrode active material contained in the negative-electrode mixture layer is a polyacene-based organic semiconductor, wherein the ratio of (the number of hydrogen atoms)/(the number of carbon atoms) is 0.05 or more and 0.50 or less.

* * * * *